United States Patent
Zhang et al.

(10) Patent No.: US 10,104,622 B2
(45) Date of Patent: Oct. 16, 2018

(54) UPLINK POWER CONTROL METHOD AND APPARATUS

(71) Applicant: Huawei Technologies Co., Ltd., Shenzhen (CN)

(72) Inventors: Jian Zhang, Shanghai (CN); Qufang Huang, Shanghai (CN); Mingzeng Dai, Shanghai (CN); Qinghai Zeng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 495 days.

(21) Appl. No.: 14/978,060

(22) Filed: Dec. 22, 2015

(65) Prior Publication Data
US 2016/0112961 A1    Apr. 21, 2016

Related U.S. Application Data

(63) Continuation of application No. PCT/CN2013/078517, filed on Jun. 29, 2013.

(51) Int. Cl.
| | |
|---|---|
| *H04B 7/00* | (2006.01) |
| *H04W 52/14* | (2009.01) |
| *H04W 52/24* | (2009.01) |
| *H04W 52/36* | (2009.01) |
| *H04W 52/34* | (2009.01) |

(52) U.S. Cl.
CPC ....... *H04W 52/146* (2013.01); *H04W 52/242* (2013.01); *H04W 52/34* (2013.01); *H04W 52/365* (2013.01)

(58) Field of Classification Search
CPC .................................................. H04W 52/146
See application file for complete search history.

(56) References Cited

U.S. PATENT DOCUMENTS

| | | | | |
|---|---|---|---|---|
| 2012/0044882 A1* | 2/2012 | Kim | ..... | H04L 5/0058 370/329 |
| 2012/0113845 A1 | 5/2012 | Kim et al. | | |

FOREIGN PATENT DOCUMENTS

| | | |
|---|---|---|
| CN | 102575477 A | 7/2012 |
| CN | 102595477 A | 7/2012 |
| CN | 102638894 A | 8/2012 |
| CN | 103069870 A | 4/2013 |

OTHER PUBLICATIONS

"3rd Generation Partnership Project; Technical Specification Group Radio Access Network; Evolved Universal Terrestrial Radio Access (E-UTRA); User Equipment (UE) Radio Transmission and Reception (Release 11)," 3GPP TS 36.101, V11.4.0, Mar. 2013, 181 pages.

* cited by examiner

*Primary Examiner* — Ankur Jain
(74) *Attorney, Agent, or Firm* — Slater Matsil, LLP

(57) ABSTRACT

The present invention provides an uplink power control method and an apparatus. The method includes: receiving, by a first base station, a power headroom report PHR sent by a terminal, where the PHR includes: power headroom PH of the terminal in a serving cell provided by the first base station, a quantity of physical resource blocks PRBs allocated by a second base station to the terminal in a serving cell provided by the second base station, and PH of the terminal in the serving cell provided by the second base station, and controlling, by the first base station according to the PHR, transmit power of the terminal in the serving cell provided by the first base station.

20 Claims, 8 Drawing Sheets

```
┌─────────────────────────────────────────────┐
│ A first base station receives a PHR sent by a terminal, where │
│   the PHR includes: PH of the terminal in a serving cell      │
│   provided by the first base station, a quantity of PRBs      │
│   allocated by a second base station to the terminal in a     │──── S 101
│ serving cell provided by the second base station, and PH of   │
│ the terminal in the serving cell provided by the second base  │
│                       station                                 │
└─────────────────────────────────────────────┘
                        │
                        ▼
┌─────────────────────────────────────────────┐
│ The first base station adds, to the PHR, a quantity of PRBs   │
│   allocated by the first base station to the terminal in the  │
│ serving cell provided by the first base station; or, a quantity│
│ of PRBs allocated by the first base station to the terminal in│
│ the serving cell provided by the first base station and MCS   │
│   index information of the serving cell provided by the first │
│   base station; or, a quantity of PRBs allocated by the first │──── S 201
│ base station to the terminal in the serving cell provided by  │
│     the first base station and a closed-loop power control    │
│     parameter of the first base station; or, a quantity of PRBs│
│     allocated by the first base station to the terminal in the│
│     serving cell provided by the first base station, MCS index│
│     information of the serving cell provided by the first base│
│     station, and a closed-loop power control parameter of the │
│                       first base station                      │
└─────────────────────────────────────────────┘
                        │
                        ▼
┌─────────────────────────────────────────────┐
│ The first base station sends the PHR to the second base       │──── S 202
│                          station                              │
└─────────────────────────────────────────────┘
                        │
                        ▼
┌─────────────────────────────────────────────┐
│ The second base station controls, according to the PHR,       │
│   transmit power of the terminal in the serving cell provided │──── S 203
│                 by the second base station                    │
└─────────────────────────────────────────────┘
```

FIG. 2

A second base station receives a PHR sent by a terminal, where the PHR includes: PH of the terminal in a serving cell provided by a first base station and PH of the terminal in a serving cell provided by the second base station — S 501

The second base station receives prescheduling information sent by the first base station, where the prescheduling information is determined by the first base station according to a downlink path loss that is of the terminal in the first base station and that is determined by the first base station and according to an uplink resource that is allocated by the first base station to the terminal in the serving cell provided by the first base station — S 502

The second base station controls, according to the prescheduling information, an uplink resource for the terminal in the serving cell provided by the second base station — S 503

FIG. 5

A terminal sends to a first base station a PHR for the first base station to control transmit power of the terminal in a serving cell provided by the first base station, where the PHR includes: PH of the terminal in the serving cell provided by the first base station, a quantity of PRBs allocated by a second base station to the terminal in a serving cell provided by the second base station, and PH of the terminal in the serving cell provided by the second base station — S 601

The terminal adjusts, under control of the first base station, transmit power of the terminal in the serving cell provided by the first base station — S 602

FIG. 6

UPLINK POWER CONTROL METHOD AND APPARATUS

This application is a continuation of International Application No. PCT/CN2013/078517, filed on Jun. 29, 2013, which is hereby incorporated by reference in its entirety.

TECHNICAL FIELD

The present invention relates to the field of communications technologies, and in particular, to an uplink power control method and an apparatus.

BACKGROUND

To meet requirements of the 3rd Generation Partnership Project (The Third Generation Partnership Project, 3GPP for short hereinafter) communications system for a peak data rate and system bandwidth, carrier aggregation (Carrier Aggregation, CA for short hereinafter) is introduced into a 3GPP Long Term Evolution Advanced (Long Term Evolution Advanced, LTE-A for short hereinafter) system. For CA, larger bandwidth may be acquired by aggregating multiple contiguous or non-contiguous component carriers (Component Carrier, CC for short hereinafter). The CCs may be provided by a same base station, or may be provided by different base stations, where the former is referred to as intra-base station CA, and the latter is referred to as inter-base station CA. For inter-base station CA, multiple base stations provide multiple serving cells, and the multiple serving cells have an overlapping area. A base station may perform, according to specific wireless conditions and service statuses, carrier aggregation for user equipment (User Equipment, UE for short hereinafter) on serving cells that overlap. For inter-base station CA, a power headroom report (Power headroom report, PHR for short hereinafter) sent by the UE in any serving cell can be received only by a base station corresponding to the serving cell, and the base station that receives the PHR cannot learn an uplink resource allocation status of a serving cell provided by another base station. Consequently, in a same subframe, uplink resources allocated by base stations to the UE may fail to match an actual transmission capability of the UE, and therefore transmit power of the UE cannot be effectively controlled.

SUMMARY

The present invention provides an uplink power control method and an apparatus, which are used to resolve a prior-art technical problem that transmit power of UE cannot be effectively controlled because uplink resources allocated by base stations to the UE do not match an actual transmission capability of the UE.

A first aspect of the embodiments of the present invention provides an uplink power control method, including:

receiving, by a first base station, a power headroom report PHR sent by a terminal, where the PHR includes: power headroom PH of the terminal in a serving cell provided by the first base station, a quantity of physical resource blocks PRBs allocated by a second base station to the terminal in a serving cell provided by the second base station, and PH of the terminal in the serving cell provided by the second base station; and controlling, by the first base station according to the PHR, transmit power of the terminal in the serving cell provided by the first base station.

With reference to the first aspect, in a first possible implementation manner of the first aspect, the PHR further includes maximum transmit power of the terminal in the serving cell provided by the second base station.

With reference to the first aspect, in a second possible implementation manner of the first aspect, the controlling, by the first base station according to the PHR, transmit power of the terminal in the serving cell provided by the first base station includes:

determining, by the first base station according to the PHR, a downlink path loss of the terminal in the serving cell provided by the first base station and a downlink path loss of the terminal in the serving cell provided by the second base station; and allocating, by the first base station to the terminal, an uplink resource for the terminal in the serving cell provided by the first base station, according to the PH of the terminal in the serving cell provided by the first base station, the downlink path loss of the terminal in the serving cell provided by the first base station, the PH of the terminal in the serving cell provided by the second base station, and the downlink path loss of the terminal in the serving cell provided by the second base station.

With reference to the second possible implementation manner of the first aspect, in a third possible implementation manner of the first aspect, the determining, by the first base station according to the PHR, a downlink path loss of the terminal in the serving cell provided by the first base station and a downlink path loss of the terminal in the serving cell provided by the second base station is specifically:

determining, by the first base station, the downlink path loss of the terminal in the serving cell provided by the first base station, according to a quantity of PRBs allocated by the first base station to the terminal in the serving cell provided by the first base station, the PH of the terminal in the serving cell provided by the first base station, and maximum transmit power of the terminal in the serving cell provided by the first base station; and determining, by the first base station, the downlink path loss of the terminal in the serving cell provided by the second base station, according to the quantity of PRBs allocated by the second base station to the terminal in the serving cell provided by the second base station, the PH of the terminal in the serving cell provided by the second base station, and maximum transmit power of the terminal in the serving cell provided by the second base station.

With reference to any one of the first aspect to the third possible implementation manner of the first aspect, in a fourth possible implementation manner of the first aspect, the PHR further includes: data modulation and coding scheme MCS index information of the serving cell provided by the second base station and/or a closed-loop power control parameter of the serving cell provided by the second base station; and the determining, by the first base station according to the PHR, a downlink path loss of the terminal in the serving cell provided by the first base station and a downlink path loss of the terminal in the serving cell provided by the second base station is specifically:

determining, by the first base station, the downlink path loss of the terminal in the serving cell provided by the first base station, according to a quantity of PRBs allocated by the first base station to the terminal in the serving cell provided by the first base station, the PH of the terminal in the serving cell provided by the first base station, maximum transmit power of the terminal in the serving cell provided by the first base station, and MCS index information of the serving cell provided by the first base station and/or a closed-loop power control parameter of the serving cell provided by the first base station; and determining, by the first base station, the downlink path loss of the terminal in the serving cell provided by the second base station, according to the quantity of PRBs allocated by the second base station to the terminal in the serving cell provided by the second base station, the PH of the terminal in the serving cell provided by the second base station, maximum transmit power of the terminal in the serving cell provided by the second base station, and the MCS index information of the serving cell provided by the second base station and/or the closed-loop power control parameter of the serving cell provided by the second base station.

With reference to any one of the first aspect to the fourth possible implementation manner of the first aspect, in a fifth possible implementation manner of the first aspect, the method further includes:

sending, by the first base station, the PHR to the second base station, so that the second base station controls, according to the PHR, transmit power of the terminal in the serving cell provided by the second base station.

With reference to the fifth possible implementation manner of the first aspect, in a sixth possible implementation manner of the first aspect, the method further includes:

adding, by the first base station to the PHR, the quantity of PRBs allocated by the first base station to the terminal in the serving cell provided by the first base station; or, the quantity of PRBs allocated by the first base station to the terminal in the serving cell provided by the first base station and the MCS index information of the serving cell provided by the first base station; or, the quantity of PRBs allocated by the first base station to the terminal in the serving cell provided by the first base station and the closed-loop power control parameter of the first base station; or, the quantity of PRBs allocated by the first base station to the terminal in the serving cell provided by the first base station, the MCS index information of the serving cell provided by the first base station, and the closed-loop power control parameter of the first base station.

A second aspect of the embodiments of the present invention provides an uplink power control method, including:

sending, by a terminal to a first base station, a power headroom report PHR for the first base station to control transmit power of the terminal in a serving cell provided by the first base station, where the PHR includes: power headroom PH of the terminal in the serving cell provided by the first base station, a quantity of physical resource blocks PRBs allocated by a second base station to the terminal in a serving cell provided by the second base station, and PH of the terminal in the serving cell provided by the second base station; and adjusting, by the terminal under control of the first base station, the transmit power of the terminal in the serving cell provided by the first base station.

With reference to the second aspect, in a first possible implementation manner of the second aspect, the method further includes: adjusting, by the terminal under control of the second base station, transmit power of the terminal in the serving cell provided by the second base station, where the control of the second base station is determined by the second base station according to a PHR that is sent by the first base station to the second base station.

With reference to the first possible implementation manner of the second aspect, in a second possible implementation manner of the second aspect, the PHR further includes: data modulation and coding scheme MCS index information of the serving cell provided by the second base station and/or a closed-loop power control parameter of the serving cell provided by the second base station.

A third aspect of the present invention provides a base station, including:

a receiving module, configured to receive a power headroom report PHR sent by a terminal, where the PHR includes: power headroom PH of the terminal in a serving cell provided by a first base station, a quantity of physical resource blocks PRBs allocated by a second base station to the terminal in a serving cell provided by the second base station, and PH of the terminal in the serving cell provided by the second base station; and a control module, configured to control, according to the PHR, transmit power of the terminal in the serving cell provided by the first base station.

With reference to the third aspect, in a first possible implementation manner of the third aspect, the PHR further includes maximum transmit power of the terminal in the serving cell provided by the second base station.

With reference to the third aspect, in a second possible implementation manner of the third aspect, the control module includes:

a downlink path loss determining unit, configured to determine, according to the PHR, a downlink path loss of the terminal in the serving cell provided by the first base station and a downlink path loss of the terminal in the serving cell provided by the second base station; and a control unit, configured to allocate, to the terminal, an uplink resource for the terminal in the serving cell provided by the first base station, according to the PH of the terminal in the serving cell provided by the first base station, the downlink path loss of the terminal in the serving cell provided by the first base station, the PH of the terminal in the serving cell provided by the second base station, and the downlink path loss of the terminal in the serving cell provided by the second base station.

With reference to the second possible implementation manner of the third aspect, in a third possible implementation manner of the third aspect, the downlink path loss determining unit is specifically configured to determine the downlink path loss of the terminal in the serving cell provided by the first base station, according to a quantity of PRBs allocated by the first base station to the terminal in the serving cell provided by the first base station, the PH of the terminal in the serving cell provided by the first base station, and maximum transmit power of the terminal in the serving cell provided by the first base station; and is further configured to determine the downlink path loss of the terminal in the serving cell provided by the second base station, according to the quantity of PRBs allocated by the second base station to the terminal in the serving cell provided by the second base station, the PH of the terminal in the serving cell provided by the second base station, and maximum transmit power of the terminal in the serving cell provided by the second base station.

With reference to any one of the third aspect to the third possible implementation manner of the third aspect, in a fourth possible implementation manner of the third aspect, the PHR further includes: data modulation and coding scheme MCS index information of the serving cell provided by the second base station and/or a closed-loop power control parameter of the serving cell provided by the second base station; and the downlink path loss determining unit is specifically configured to determine the downlink path loss of the terminal in the serving cell provided by the first base station, according to a quantity of PRBs allocated by the first base station to the terminal in the serving cell provided by the first base station, the PH of the terminal in the serving cell provided by the first base station, maximum transmit power of the terminal in the serving cell provided by the first base station, and MCS index information of the serving cell provided by the first base station and/or a closed-loop power control parameter of a serving cell provided by the first base station; and is further configured to determine the downlink path loss of the terminal in the serving cell provided by the second base station, according to the quantity of PRBs allocated by the second base station to the terminal in the serving cell provided by the second base station, the PH of the terminal in the serving cell provided by the second base station, maximum transmit power of the terminal in the serving cell provided by the second base station, and the MCS index information of the serving cell provided by the second base station and/or the closed-loop power control parameter of the serving cell provided by the second base station.

With reference to any one of the third aspect to the fourth possible implementation manner of the third aspect, in a fifth possible implementation manner of the third aspect, the base station further includes:

a sending module, configured to: after the receiving module receives the power headroom report PHR sent by the terminal, send the PHR to the second base station, so that the second base station controls, according to the PHR, transmit power of the terminal in the serving cell provided by the second base station.

With reference to the fifth possible implementation manner of the third aspect, in a sixth possible implementation manner of the third aspect, the sending module is further configured to: before sending the PHR to the second base station, add, to the PHR, the quantity of PRBs allocated by the first base station to the terminal in the serving cell provided by the first base station; or, the quantity of PRBs allocated by the first base station to the terminal in the serving cell provided by the first base station and the MCS index information of the serving cell provided by the first base station; or, the quantity of PRBs allocated by the first base station to the terminal in the serving cell provided by the first base station and the closed-loop power control parameter of the first base station; or, the quantity of PRBs allocated by the first base station to the terminal in the serving cell provided by the first base station, the MCS index information of the serving cell provided by the first base station, and the closed-loop power control parameter of the first base station.

A fourth aspect of the embodiments of the present invention provides a terminal, including:

a sending module, configured to send to a first base station a power headroom report PHR for the first base station to control transmit power of the terminal in a serving cell provided by the first base station, where the PHR includes: power headroom PH of the terminal in the serving cell provided by the first base station, a quantity of physical resource blocks PRBs allocated by a second base station to the terminal in a serving cell provided by the second base station, and PH of the terminal in the serving cell provided by the second base station; and an adjustment module, configured to adjust, under control of the first base station, the transmit power of the terminal in the serving cell provided by the first base station.

With reference to the fourth aspect, in a first possible implementation manner of the fourth aspect, the adjustment module is further configured to adjust, under control of the second base station, transmit power of the terminal in the serving cell provided by the second base station, where the control of the second base station is determined by the second base station according to a PHR that is sent by the first base station to the second base station.

With reference to the first possible implementation manner of the fourth aspect, in a second possible implementation manner of the fourth aspect, the PHR further includes:

data modulation and coding scheme MCS index information of the serving cell provided by the second base station and/or a closed-loop power control parameter of the serving cell provided by the second base station.

According to the uplink power control method provided in the embodiments of the present invention, a terminal sends a PHR to a first base station, where the PHR carries PH of the terminal in the first base station, PH of the terminal in a second base station, and a quantity of PRBs allocated by the second base station to the terminal in a serving cell provided by the second base station, so that the first base station can learn wireless conditions of the terminal in serving cells of the first base station and the second base station according to the PHR, then dynamically adjust, according to the wireless conditions, an uplink resource allocation status of the terminal in the serving cell provided by the first base station, and further control transmit power of the terminal in a serving cell provided by the first base station. This improves accuracy that a base station controls transmit power of a terminal.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 2 is a schematic flowchart of Embodiment 2 of the uplink power control method according to the present invention;

FIG. 5 is a schematic flowchart of Embodiment 4 of the uplink power control method according to the present invention;

FIG. 6 is a schematic flowchart of Embodiment 5 of the uplink power control method according to the present invention;

DETAILED DESCRIPTION OF ILLUSTRATIVE EMBODIMENTS

Figure 1:
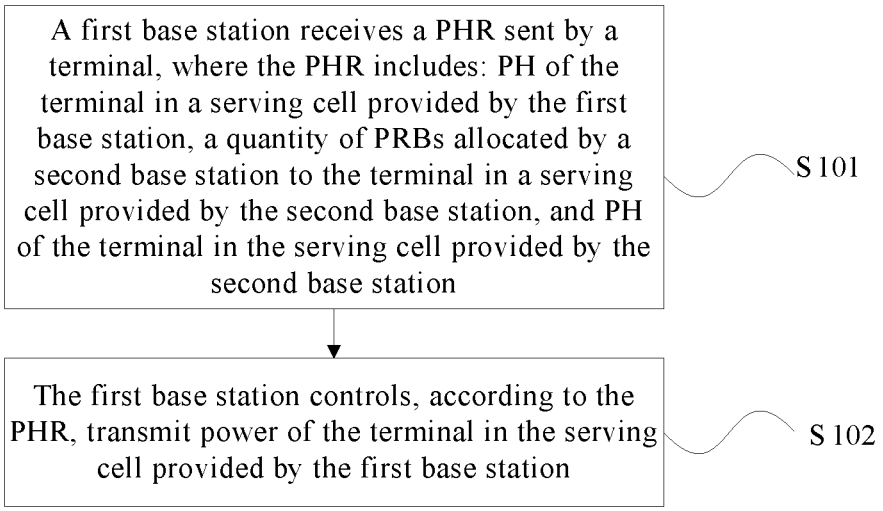
FIG. 1 is a schematic flowchart of Embodiment 1 of an uplink power control method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM, Global System for Mobile communications), a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access Wireless), a Frequency Division Multiple Access (FDMA, Frequency Division Multiple Addressing) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, a Long Term Evolution (LTE, Long Term Evolution) system, and other communications systems.

A terminal involved in this application, that is, user equipment, may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges languages and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The base station (for example, an access point) involved in this application may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, a base station may be a base station (BTS, Base Transceiver Station) in the GSM or CDMA, or may be a base station (NodeB) in the WCDMA, or may be an evolved NodeB (NodeB, eNB or e-NodeB, evolutional Node B) in the LTE. For another example, the base station may also be a master base station, a secondary base station, a small cell (small cell, pico or femto), a macro cell (macro cell), or the like, which is not limited in this application.

In this application, the base station may also be implemented by a repeater node, a remote radio head (remote radio head, RRH), a radio remote unit (radio remote unit, RRH), an antenna port (antenna port), or the like, which are uniformly referred to as a transmission point (transmission point, TP).

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

FIG. 1 is a schematic flowchart of Embodiment 1 of an uplink power control method according to the present invention. The method is executed by a base station or an uplink power control apparatus, where the uplink power control apparatus may be integrated into the base station. As shown in FIG. 1, the method includes the following steps:

S101: A first base station receives a power headroom report (Power headroom report, PHR for short hereinafter) sent by a terminal, where the PHR includes: power headroom (Power Headroom, PH for short hereinafter) of the terminal in a serving cell provided by the first base station, a quantity of physical resource blocks (Physical Resource Block, PRB for short hereinafter) allocated by a second base station to the terminal in a serving cell provided by the second base station, and PH of the terminal in the serving cell provided by the second base station.

The second base station in the present invention may be one base station, or may be multiple base stations. The serving cell provided by the first base station or the serving cell provided by the second base station in the present invention may be one serving cell, or may be multiple serving cells.

Specifically, the first base station sends to the terminal an uplink resource that is allocated by the first base station to the terminal in the serving cell provided by the first base station, and the second base station sends to the terminal an uplink resource that is allocated by the second base station to the terminal in the serving cell provided by the second base station. The uplink resource for the terminal in the serving cell provided by the first base station includes a quantity of PRBs allocated by the first base station to the terminal in the serving cell provided by the first base station, and the uplink resource for the terminal in the serving cell provided by the second base station includes the quantity of PRBs allocated by the second base station to the terminal in the serving cell provided by the second base station. After receiving the uplink resources, the terminal triggers the PHR according to a trigger condition, for example, that a periodic PHR timer expires, or that a change of a downlink path loss exceeds a threshold since a serving cell reported a PHR last time. After the terminal triggers the PHR, the terminal sends the PHR to the first base station, where the PHR includes: the PH of the terminal in the serving cell provided by the first base station, the quantity of PRBs allocated by the second base station to the terminal in the serving cell provided by the second base station, and the PH of the terminal in the serving cell provided by the second base station. Optionally, the PHR may further include the quantity of PRBs allocated by the first base station to the terminal in the serving cell provided by the first base station. Optionally, the terminal may send the PHR to both the first base station and the second base station, so that both the first base station and the second base station may acquire, according to the PHR reported by the terminal, a quantity of PRBs allocated by another base station to the terminal, and the PHR does not need to be forwarded by using an inter-base station interface, thereby decreasing an uncertain period resulting from a delay on the inter-base station interface. During this uncertain period, the first base station and the second base station separately and independently perform scheduling for the terminal, and consequently cannot effectively control transmit power of UE. For example, a quantity of PRBs is 100, which represents 100 PRBs and requires 7 bits. A format of a PHR is shown in Table 1. To reduce a quantity of information bits that the quantity of PRBs occupies, quantities of PRBs may be classified into several levels, for example, eight levels are classified according to a maximum quantity of PRB pairs (PRB pair), where the maximum quantity of PRB pairs is 16, 24, 32, 36, 40, 48, or 50, and therefore only three bits are occupied. A PRB index (PRB index) is used for representation. A format of a PHR is shown in Table 2. A base station performs resource scheduling on a PRB-pair basis, that is, a minimum schedulable unit of resources is two PRBs. Using this representation method can effectively reduce bits that PRB information occupies, facilitate combination with an MCS index (MCS index) field into one byte for byte alignment, and reduce signaling overheads. In Table 1 and Table 2, Pcell represents a primary serving cell, Scell represents a secondary serving cell, and $C_1$-$C_7$ represent serving cells of the first base station and the second base station. A value of C being 1 indicates that the PHR includes information of this cell; a value of V being 1 indicates a virtual PHR format, which indicates that no uplink resource is allocated in this serving cell; P indicates whether power back-off is performed in a current serving cell; and R is a reserved field.

TABLE 1

| $C_7$ | $C_6$ | $C_5$ | $C_4$ | $C_3$ | $C_2$ | $C_1$ | R |
|---|---|---|---|---|---|---|---|
| P | V | | | PH (Type2, Pcell) | | | |
| R | R | | | $P_{CMAX, c}$ 1 | | | |
| P | V | | | PH (Type1, Pcell) | | | |
| R | R | | | $P_{CMAX, c}$ 2 | | | |
| R | | | | PRB | | | |
| R | R | R | | MCS index | | | |
| P | V | | | PH (Type1, Scell 1) | | | |
| R | R | | | $P_{CMAX, c}$ 3 | | | |
| R | | | | PRB | | | |
| R | R | R | | MCS index | | | |
| | | | | ... | | | |
| P | V | | | PH (Type1, Scell n) | | | |
| R | R | | | $P_{CMAX, c}$ m | | | |

TABLE 2

| $C_7$ | $C_6$ | $C_5$ | $C_4$ | $C_3$ | $C_2$ | $C_1$ | R |
|---|---|---|---|---|---|---|---|
| P | V | | | PH (Type2, Pcell) | | | |
| R | R | | | $P_{CMAX, c}$ 1 | | | |
| P | V | | | PH (Type1, Pcell) | | | |
| R | R | | | $P_{CMAX, c}$ 2 | | | |
| | | PRB index | | MCS index | | | |
| P | V | | | PH (Type2, Scell 1) | | | |
| R | R | | | $P_{CMAX, c}$ 3 | | | |
| | | PRB index | | MCS index | | | |
| | | | | ... | | | |
| P | V | | | PH (Type2, Scell n) | | | |
| R | R | | | $P_{CMAX, c}$ m | | | |

The first base station receives the PHR sent by the terminal, and obtains by calculation, according to maximum transmit power that is configured by the first base station for the terminal in the serving cell provided by the first base station and the received PH of the terminal in the serving cell provided by the first base station, transmit power of the terminal in the serving cell provided by the first base station. The terminal herein may communicate with the first base station by using one cell of serving cells provided by the first base station, or may communicate with the first base station by using multiple serving cells. Therefore, the transmit power of the terminal may be obtained by calculation according to uplink resources allocated by the first base station to the terminal in the serving cell provided by the first base station, which is a sum of transmit power when the terminal sends data in all serving cells according to these uplink resources.

Generally, the terminal sends data on a physical uplink shared channel (Physical Uplink Shared Channel, PUSCH for short hereinafter) and/or a physical uplink control channel (Physical Uplink Control Channel, PUCCH for short hereinafter), where the data includes user data and/or signaling. The PH sent by the terminal to the first base station may be categorized into two types of PH: type 1 and type 2. For PH of type 1 (Type1), a calculation formula is PH=$P_{CMAX,c}$−$P_{PUSCH,c}$ (formula 1), where the formula 1 is specific to a case in which the terminal sends data only on the PUSCH. For PH of type 2 (Type), a calculation formula is PH=$P_{CMAX,c}$−$P_{PUSCH,c}$−$P_{PUCCH,c}$ (formula 2), where the formula 2 is specific to a case in which the terminal sends data on both the PUSCH and the PUCCH. $P_{CMAX,c}$ is maximum transmit power of the terminal in a primary cell (Pcell) or an active-state serving cell that is provided by the first base station or the second base station, $P_{PUSCH,c}$ is transmit power of the terminal in the serving cell provided by the first base station or the second base station on the PUSCH, and $P_{PUCCH,c}$ is transmit power of the terminal in the serving cell provided by the first base station or the second base station on the PUCCH. In addition, $P_{CMAX,c}$ may be maximum transmit power based on a status of an allocated uplink resource (maximum transmit power of the terminal known to the base station is a range, and the terminal needs to report an accurate maximum transmit power value to the first base station), or may be maximum transmit power in a case in which the first base station or the second base station does not allocate an uplink resource to the terminal (this is an upper limit of maximum transmit power that the first base station or the second base station pre-configures for the terminal in the serving cell provided by the first base station or the second base station, where the maximum transmit power of the terminal is the upper limit of maximum transmit power configured by the base station).

S102: The first base station controls, according to the PHR, transmit power of the terminal in the serving cell provided by the first base station.

In the present invention, a case in which the terminal sends data only on a PUSCH is used as an example to describe the entire technical solution. However, the present invention is also applicable to a case in which the terminal sends data on both a PUSCH and a PUCCH, where only formulas that are used are different, which are described with examples in the following embodiments.

The first base station may obtain, according to the PH that is of the terminal in the serving cell provided by the first base station and is reported by the terminal and maximum transmit power $P_{CMAX,c}$ of the terminal in the serving cell provided by the first base station and by using the formula 1, $P_{PUSCH,c}$ of the terminal in the serving cell provided by the first base station. The maximum transmit power $P_{CMAX,c}$ of the terminal in the serving cell provided by the first base station may be obtained by means of the prior art. Optionally, maximum transmit power of the terminal known to the first base station is a range, and the terminal needs to report to the first base station an accurate maximum transmit power value that falls within this range. Alternatively, the first base station pre-configures an upper limit of maximum transmit power for the terminal in the serving cell provided by the first base station, where the maximum transmit power of the terminal is the upper limit of maximum transmit power pre-configured by the first base station (in this case, the terminal does not need to report the maximum transmit power of the terminal to the first base station). Then, the first base station may learn a wireless condition of the terminal in the serving cell provided by the first base station (this wireless condition may be a downlink path loss when the terminal sends data in the serving cell provided by the first base station or other parameter information that reflects wireless transmission quality in the serving cell provided by the first base station) according to a formula 3

$$P_{PUSCH,c}(i) = \min\left\{\begin{array}{c} P_{CMAX,c}(i), \\ 10\log_{10}(M_{PUSCH,c}(i)) + P_{O\_PUSCH,c}(j) + \alpha_c(j) \cdot PL_c \end{array}\right\}$$

and the quantity of PRBs allocated by the first base station to the terminal in the serving cell provided by the first base station. Then the first base station determines, according to the wireless condition, a status of an uplink resource allocated by the first base station to the terminal in the serving cell provided by the first base station (the uplink resource determined herein refers to an uplink resource that the first base station allocates to the terminal for next data transmission of the terminal). In the formula 3, $P_{PUSCH,c}(i)$ is maximum transmit power when the terminal transmits data in a subframe i to the serving cell provided by the first base station or the serving cell provided by the second base station; $M_{PUSCH,c}(i)$ is allocated uplink resource bandwidth represented by the quantity of PRBs that are allocated by the first base station to the terminal in the serving cell provided by the first base station, or, allocated uplink resource bandwidth represented by the quantity of PRBs that are allocated by the second base station to the terminal in the serving cell provided by the second base station; $P_{O\_PUSCH,c}(j)$ is transmit power configured by an upper protocol layer for the terminal; $\alpha_c(j)$ is a path loss compensation coefficient specific to the serving cell provided by the first base station or the second base station; $PL_c$ is a downlink path loss of the terminal in the serving cell provided by the first base station or the second base station; and a measurement unit of $P_{PUSCH,c}(i)$ is dBm (dBm).

It should be noted that the parameters used when the first base station determines an uplink resource allocated to the terminal for next transmission in the serving cell provided by the first base station are parameters related to the first base station. For example, the used $P_{PUSCH,c}(i)$ is maximum transmit power when the terminal transmits data in the subframe i to the serving cell provided by the first base station; the used $M_{PUSCH,c}(i)$ is allocated uplink resource bandwidth represented by the quantity of PRBs that is allocated by the first base station to the terminal in the serving cell provided by the first base station; the used is $\alpha_c(j)$ is a path loss compensation coefficient specific to the serving cell provided by the first base station; and the used $PL_c$ is a downlink path loss of the terminal in the serving cell provided by the first base station.

On the other hand, the first base station may also obtain, according to the formula 1 and maximum transmit power $P_{CMAX,c}$ of the terminal in the serving cell provided by the second base station, $P_{PUSCH,c}$ of the terminal in the serving cell provided by the second base station. Maximum transmit power of the terminal known to the second base station is a range, and the terminal reports to the first base station an accurate maximum transmit power value that falls within this range. Alternatively, the second base station pre-configures an upper limit value of maximum transmit power for the terminal in the serving cell provided by the second base station, and the maximum transmit power of the terminal is the upper limit value of maximum transmit power configured by the second base station. Then, according to the formula 3 and the quantity of PRBs allocated by the second base station to the terminal in the serving cell provided by the second base station, the first base station may learn a wireless condition of the terminal in the serving cell provided by the second base station (this wireless condition may a downlink path loss when the terminal sends data in the serving cell provided by the second base station or other parameter information that reflects radio transmission quality in the serving cell provided by the second base station), and then learn a status of an uplink resource allocated by the second base station to the terminal in the serving cell provided by the second base station.

It should be noted that an uplink resource allocation status of the terminal in the serving cell provided by the first base station and an uplink resource allocation status of the terminal in the serving cell provided by the second base station can be determined not only by using the formula 1 and the formula 3 but also by using a combination of the formula 1 and another formula. The formula 3 herein is not the only formula option, and in the field of uplink power control technologies, the formula 3 may be replaced with another related formula. For example, when the terminal sends both data and signaling on a PUSCH and a PUCCH in the serving cell provided by the first base station, the following formula is used:

$$P_{PUSCH,c}(i) = \min \left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

where $P_{CMAX,c}(i)$ represents maximum transmit power of the terminal in a corresponding serving cell, and $\hat{P}_{PUCCH}(i)$ represents transmit power of the terminal on the PUCCH.

After the first base station determines the uplink resource allocation status of the terminal in the serving cell provided by the first base station and learns the uplink resource allocation status of the terminal in the second base station, optionally, the first base station learns, by using an X2 interface, a resource adjustment rule of the second base station, then adjusts, according to the resource adjustment status of the second base station, the resource allocation status of the terminal in the serving cell provided by the first base station, and further controls the transmit power of the terminal in the serving cell provided by the first base station; or, optionally, the first base station and the second base station may also interact in advance by using the X2 interface to determine an uplink resource allocation algorithm, and the first base station determines, according to the quantity of PRBs for the terminal in the serving cell provided by the second base station and the uplink resource allocation algorithm, a status of uplink resource allocation by the second base station for the terminal, and then allocates an appropriate uplink resource to the terminal according to the status of uplink resource allocation by the second base station for the terminal.

According to the uplink power control method provided in this embodiment of the present invention, a terminal sends a PHR to a first base station, where the PHR carries PH of the terminal in the first base station, PH of the terminal in a second base station, and a quantity of PRBs allocated by the second base station to the terminal in a serving cell provided by the second base station, so that the first base station can learn wireless conditions of the terminal in serving cells of the first base station and the second base station according to the PHR, then dynamically adjust, according to the wireless conditions, an uplink resource allocation status of the terminal in the serving cell provided by the first base station, and further control transmit power of the terminal in a serving cell provided by the first base station. This improves accuracy that a base station controls transmit power of a terminal.

On the basis of Embodiment 1 of the present invention, further, the PHR further includes: maximum transmit power of the terminal in the serving cell provided by the second base station. The controlling, by the first base station, transmit power of the terminal in the serving cell provided by the first base station includes: determining, by the first base station according to the PHR, a downlink path loss of the terminal in the serving cell provided by the first base station and a downlink path loss of the terminal in the serving cell provided by the second base station; and allocating, by the first base station to the terminal, an uplink resource for the terminal in the serving cell provided by the first base station, according to the PH of the terminal in the serving cell provided by the first base station, the downlink path loss of the terminal in the serving cell provided by the first base station, the PH of the terminal in the serving cell provided by the second base station, and the downlink path loss of the terminal in the serving cell provided by the second base station.

The determining, by the first base station according to the PHR, a downlink path loss of the terminal in the serving cell provided by the first base station and a downlink path loss of the terminal in the serving cell provided by the second base station is specifically: determining, by the first base station the downlink path loss of the terminal in the serving cell provided by the first base station, according to a quantity of PRBs allocated by the first base station to the terminal in the serving cell provided by the first base station, the PH of the terminal in the serving cell provided by the first base station, and maximum transmit power of the terminal in the serving cell provided by the first base station; and determining, by the first base station, the downlink path loss of the terminal in the serving cell provided by the second base station, according to the quantity of PRBs allocated by the second base station to the terminal in the serving cell provided by the second base station, the PH of the terminal in the serving cell provided by the second base station, and maximum transmit power of the terminal in the serving cell provided by the second base station.

Specifically, the first base station obtains $P_{PUSCH,c}$ of the terminal in the subframe i in the serving cell provided by the first base station, according to the PH that is of the terminal in the serving cell provided by the first base station and is reported by the terminal and the maximum transmit power $P_{CMAX,c}$ of the terminal in the serving cell provided by the first base station and according to the formula 1, and then obtains the downlink path loss $PL_c$ of the terminal in the serving cell provided by the first base station, according to the formula 3 and the quantity of PRBs allocated by the first base station to the terminal in the serving cell provided by the first base station (the quantity of PRBs herein determines a value of $M_{PUSCH,c}$ (i) in the formula 3), where $PL_c$ represents a wireless condition in the serving cell provided by the first base station. It should be noted that, in the formula 3, $P_{O\_PUSCH,c}$ (i) is transmit power configured by an upper protocol layer for the terminal, and is $\alpha_c(i)$ is a path loss compensation coefficient specific to the serving cell provided by the first base station or the second base station, which are both known to the first base station. In addition, $PL_c$ obtained by the first base station according to the formula 3 is a downlink path loss when the terminal sends the current PHR, and the first base station may estimate, according to this $PL_c$ obtained by calculation, $PL_c$ when the terminal transmits data in the serving cell provided by the first base station next time. On the other hand, the first base station also obtains, according to the PH that is of the terminal in the serving cell provided by the second base station and is reported by the terminal and the maximum transmit power $P_{CMAX,c}$ of the terminal in the serving cell provided by the second base station and according to the formula 1, $P_{PUSCH,c}$ of the terminal in subframe i in the serving cell provided by the second base station, and then obtains, according to the formula 3 and the quantity of PRBs allocated by the second base station to the terminal in the serving cell provided by the second base station, the downlink path loss $PL_c$ of the terminal in the serving cell provided by the second base station, where the downlink path loss $PL_c$ of the terminal in the serving cell provided by the second base station represents a wireless condition in the serving cell provided by the second base station. In addition, the downlink path loss $PL_c$ that is obtained by the first base station according to the formula 3 and when the terminal transmits data in the serving cell provided by the second base station is a downlink path loss when the terminal sends the current PHR, and the first base station may estimate, according to this $PL_c$ obtained by calculation, $PL_c$ when the terminal transmits data in the serving cell provided by the second base station next time.

After the first base station obtains the downlink path loss $PL_c$ when the terminal transmits data in the serving cell provided by the first base station next time, the first base station allocates, according to the PH of the terminal in the serving cell provided by the first base station and the downlink path loss $PL_c$ when the terminal transmits data in the serving cell provided by the first base station next time, an uplink resource required for the terminal to transmit data in the serving cell provided by the first base station next time. In addition, the first base station further estimates, according to the downlink path loss $PL_c$ when the terminal transmits data in the serving cell provided by the second base station next time and the PH of the terminal in the serving cell provided by the second base station, a status of allocation by the second base station for the terminal, of an uplink resource required for the next data transmission in the serving cell provided by the second base station. Optionally, the first base station learns, by using the X2 interface between the first base station and the second base station, an uplink resource adjustment rule of the second base station, then adjusts, according to the uplink resource adjustment rule of the second base station, the uplink resource allocated by the first base station to the terminal in the serving cell provided by the first base station, and further controls, according to the uplink resource allocated by the first base station to the terminal, transmit power of the terminal in the serving cell provided by the first base station; or, optionally, the first base station and the second base station may also interact in advance by using the X2 interface to determine an uplink resource allocation algorithm, and the first base station determines, according to the quantity of PRBs for the terminal in the serving cell provided by the second base station and the uplink resource allocation algorithm, a status of uplink resource allocation by the second base station for the terminal, and then allocates an appropriate uplink resource to the terminal according to the status of uplink resource allocation by the second base station for the terminal.

Further, on the basis of the foregoing embodiment, the PHR further includes: data modulation and coding scheme (Modulation and Coding Scheme, MCS for short hereinafter) index information of the serving cell provided by the second base station and/or a closed-loop power control parameter of the serving cell provided by the second base station. The determining, by the first base station according to the PHR, a downlink path loss of the terminal in the serving cell provided by the first base station and a downlink path loss of the terminal in the serving cell provided by the second base station is specifically: determining, by the first base station, the downlink path loss of the terminal in the serving cell provided by the first base station, according to a quantity of PRBs allocated by the first base station to the terminal in the serving cell provided by the first base station, the PH of the terminal in the serving cell provided by the first base station, maximum transmit power of the terminal in the serving cell provided by the first base station, and MCS index information of the serving cell provided by the first base station and/or a closed-loop power control parameter of the serving cell provided by the first base station; and determining, by the first base station, the downlink path loss of the terminal in the serving cell provided by the second base station, according to the quantity of PRBs allocated by the second base station to the terminal in the serving cell provided by the second base station, the PH of the terminal in the serving cell provided by the second base station, maximum transmit power of the terminal in the serving cell provided by the second base station, and the MCS index information of the serving cell provided by the second base station and/or the closed-loop power control parameter of the serving cell provided by the second base station.

Specifically, the first base station obtains, according to the PH that is of the terminal in the serving cell provided by the first base station and is reported by the terminal and the maximum transmit power $P_{CMAX,c}$ of the terminal in the serving cell provided by the first base station and according to the formula 1, $P_{PUSCH,c}$ of the terminal in the subframe i in the serving cell provided by the first base station, and then obtains the downlink path loss $PL_c$ of the terminal in the serving cell provided by the first base station by using a formula 4:

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

and according to the quantity of PRBs allocated by the first base station to the terminal in the serving cell provided by the first base station (the quantity of PRBs herein determines a value of $M_{PUSCH,c}$ (i) in the formula 4), where the downlink path loss $PL_c$ of the terminal in the serving cell provided by the first base station represents a wireless condition of the terminal in the serving cell provided by the first base station. It should be noted that, in the formula 4, $P_{PUSCH,c}(i)$ is maximum transmit power of the terminal in the subframe i in the serving cell provided by the first base station or the second base station; $M_{PUSCH,c}(i)$ is allocated uplink resource bandwidth represented by the quantity of PRBs that are allocated by the first base station to the terminal in the serving cell provided by the first base station, or allocated uplink resource bandwidth represented by the quantity of PRBs that are allocated by the second base station to the terminal in the serving cell provided by the second base station; $P_{O\_PUSCH,c}$ (j) is transmit power configured by an upper protocol layer for the terminal; $\alpha_c$ (j) is a path loss compensation coefficient specific to the serving cell provided by the first base station or the second base station; $\Delta_{TF,c}$ (i) is a transmit power offset, of the terminal, determined by the serving cell provided by the first base station or the second base station according to MCS index information, where in a case in which a wireless condition of a serving cell is unstable, transmit power of the terminal varies with the MCS index information; and $f_c(i)$ is a closed-loop power control parameter of the terminal in the serving cell provided by the first base station or the second base station. In addition, $PL_c$ obtained by the first base station according to the formula 4 is a downlink path loss when the terminal transmits data in the serving cell provided by the first base station last time, and the first base station estimates, according to this $PL_c$ obtained by calculation, $PL_c$ when the terminal transmits data in the serving cell provided by the first base station next time. On the other hand, the first base station also obtains, according to the PH that is of the terminal in the serving cell provided by the second base station and is reported by the terminal and the maximum transmit power $P_{CMAX,c}$ of the terminal in the serving cell provided by the second base station and according to the formula 1, $P_{PUSCH,c}$ of the terminal in the subframe i in the serving cell provided by the second base station, and then obtains, according to the formula 4 and the quantity of PRBs allocated by the second base station to the terminal in the serving cell provided by the second base station (the quantity of PRBs herein determines a value of $M_{PUSCH,c}(i)$ in the formula 4), the downlink path loss $PL_c$ when the terminal transmits data in the serving cell provided by the second base station, where $PL_c$ represents a wireless condition in the serving cell provided by the second base station. It should be noted that, in the formula 4, $P_{O\_PUSCH,c}(j)$, $\alpha_c(j)$ $\Delta_{TF,c}(i)$ and $f_c(i)$ are all known to the first base station. In addition, $PL_c$ obtained according to the formula 4 by the first base station is the downlink path loss when the terminal transmits data in the serving cell provided by the second base station, and the first base station estimates, according to this $PL_c$ obtained by calculation, $PL_c$ when the terminal transmits data next time in the serving cell provided by the second base station. In addition, in the formula 4, if there are no $\Delta_{TF,c}(i)$ and/or $f_c(i)$ information in the PHR, a value of the parameter $\Delta_{TF,c}(i)$ and/or $f_c(i)$ can be ignored in the formula 4, that is, a purpose of $\Delta_{TF,c}(i)$ and/or $f_c(i)$ is to enable the first base station to acquire a more accurate downlink path loss when the terminal transmits data in the serving cell provided by the first base station or the second base station. Therefore, in a case in which neither or only one of the two is included in the PHR, the first base station may also be able to acquire, according to the formula 4, the downlink path loss when the terminal transmits data in the serving cell provided by the first base station or the second base station.

After the first base station obtains the downlink path loss $PL_c$ when the terminal transmits data in the serving cell provided by the first base station next time, the first base station allocates an uplink resource to the terminal in the serving cell provided by the first base station, according to the PH of the terminal in the serving cell provided by the first base station and the downlink path loss $PL_c$ when the terminal transmits data in the serving cell provided by the first base station next time. In addition, the first base station further estimates, according to the downlink path loss $PL_c$ when the terminal transmits data in the serving cell provided by the second base station next time and the PH of the terminal in the serving cell provided by the second base station, a status of uplink resource allocation by the second base station for the terminal in the serving cell provided by the second base station. Optionally, the first base station learns, by using the X2 interface between the first base station and the second base station, an uplink resource adjustment rule of the second base station, and then adjusts, according to the uplink resource adjustment rule of the second base station, the uplink resource allocated by the first base station in the serving cell provided by the first base station; or, optionally, the first base station and the second base station may also interact in advance by using the X2 interface to determine an uplink resource allocation algorithm, and the first base station determines, according to the quantity of PRBs for the terminal in the serving cell provided by the second base station and the uplink resource allocation algorithm, a status of uplink resource allocation by the second base station for the terminal, and then allocates an appropriate uplink resource to the terminal according to the status of uplink resource allocation by the second base station for the terminal. For example, if the downlink path loss in the serving cell that is served by the first base station is relatively small, while in the serving cell that is served by the second base station, the downlink path loss is relatively large, uplink resources are relatively few, and an MCS index is relatively small, the first base station may allocate more uplink resources to the terminal in the serving cell provided by the first base station, and then control, according to the uplink resources allocated by the first base station to the terminal, the transmit power of the terminal in the serving cell provided by the first base station.

FIG. 2 is a schematic flowchart of Embodiment 2 of the uplink power control method according to the present invention. After S101, the method further includes the following steps:

S201: The first base station adds, to the PHR, the quantity of PRBs allocated by the first base station to the terminal in the serving cell provided by the first base station; or, the quantity of PRBs allocated by the first base station to the terminal in the serving cell provided by the first base station and the MCS index information of the serving cell provided by the first base station; or, the quantity of PRBs allocated by the first base station to the terminal in the serving cell provided by the first base station and the closed-loop power control parameter of the first base station; or, the quantity of PRBs allocated by the first base station to the terminal in the serving cell provided by the first base station, the MCS index information of the serving cell provided by the first base station, and the closed-loop power control parameter of the first base station.

S202: The first base station sends the PHR to the second base station.

S203: The second base station controls, according to the PHR, transmit power of the terminal in the serving cell provided by the second base station.

Specifically, after receiving the PHR sent by the terminal, the first base station adds to the PHR the quantity of PRBs in the serving cell in the first base station; or, adds to the PHR the quantity of PRBs allocated by the first base station to the terminal in the serving cell provided by the first base station and the MCS index information of the serving cell provided by the first base station; or, adds to the PHR the quantity of PRBs allocated by the first base station to the terminal in the serving cell provided by the first base station and the closed-loop power control parameter of the first base station; or, adds to the PHR the quantity of PRBs allocated by the first base station to the terminal in the serving cell provided by the first base station, the MCS index information of the serving cell provided by the first base station, and the closed-loop power control parameter of the first base station. Then, the first base station sends the PHR to the second base station. Here, the main reason that the first base station sends the PHR to the second base station is that the terminal sends the PHR to only one of the base stations after the PHR is triggered. Without receiving the PHR, the second base station cannot normally allocate an uplink resource to the terminal in the serving cell served by the second base station, and therefore cannot adjust an uplink resource allocation status of the terminal in the serving cell provided by the second base station according to the status of uplink resource allocation by the first base station for the terminal, and further cannot accurately control transmit power of the terminal. Moreover, on the other hand, the first base station and the second base station also exchange in advance some parameter information by using an X2 interface, so that the second base station can learn a time point of uplink resource update made by the first base station and learn a status of uplink resource adjustment made by the first base station for the terminal in the serving cell provided by the first base station, that is, the first base station and the second base station need to negotiate, by using the X2 interface, to regulate an adjustment rule between them. The adjustment rule herein may be a frequency of uplink resource adjustment and a rule of uplink resource adjustment made by the first base station and the second base station. For example, the first base station and the second base station accommodate each other according to specific values by defining many rules and conditions, so as to achieve more accurate power control by means of integrative adjustment than when the first base station and the second base station make adjustment separately.

Specifically, the second base station receives the PHR forwarded by the first base station, and obtains, according to the PH, in the PHR, of the terminal in the serving cell provided by the second base station and maximum transmit power $P_{CMAX,c}$ of the terminal in the serving cell provided by the second base station and according to the formula 1, $P_{PUSCH,c}$ of the terminal in a subframe i in the serving cell provided by the second base station, and then obtains, according to the formula 3 and the quantity of PRBs allocated by the second base station to the terminal in the serving cell provided by the second base station (the quantity of PRBs herein determines a value of $M_{PUSCH,c}(i)$ in the formula 3), a downlink path loss $PL_c$ of the terminal in the serving cell provided by the second base station, where $PL_c$ represents a wireless condition in the serving cell provided by the second base station. It should be noted that, in the formula 3, $P_{O\_PUSCH,c}(j)$ is transmit power configured by an upper protocol layer for the terminal, and $\alpha_c(j)$ is a path loss compensation coefficient specific to the serving cell provided by the first base station or the second base station, which are both known to the second base station. In addition, $PL_c$ obtained by the second base station according to the formula 3 is a downlink path loss when the terminal sends the current PHR, and the second base station estimates, according to this $PL_c$ obtained by calculation, $PL_c$ when the terminal transmits data in the serving cell provided by the second base station next time.

On the other hand, the second base station also obtains, according to the PH that is of the terminal in the serving cell provided by the first base station and is reported by the terminal and maximum transmit power $P_{CMAX,c}$ of the terminal in the serving cell provided by the first base station and according to the formula 1, $P_{PUSCH,c}$ of the terminal in the subframe i in the serving cell provided by the first base station, and then obtains, according to the formula 3 and the quantity of PRB s allocated by the first base station to the terminal in the serving cell provided by the first base station, a downlink path loss $PL_c$ when the terminal transmits data in the serving cell provided by the first base station, where the downlink path loss $PL_c$ of the terminal in the serving cell provided by the first base station represents a wireless condition in the serving cell provided by the first base station. In addition, the downlink path loss $PL_c$ that is obtained by the second base station according to the formula 3 and when the terminal transmits data in the serving cell provided by the first base station is a downlink path loss when the terminal sends the current PHR, and the second base station estimates, according to this $PL_c$ obtained by calculation, $PL_c$ when the terminal transmits data in the serving cell provided by the first base station next time.

After the second base station obtains a downlink path loss $PL_c$ when the terminal transmits data in the serving cell provided by the second base station next time, the second base station allocates, according to the PH of the terminal in the serving cell provided by the second base station and the downlink path loss $PL_c$ when the terminal transmits data in the serving cell provided by the second base station next time, an uplink resource to the terminal in the serving cell provided by the second base station. In addition, the second base station further estimates, according to the downlink path loss $PL_c$ when the terminal transmits data in the serving cell provided by the first base station next time and the PH of the terminal in the serving cell provided by the first base station, a status of uplink resource allocation by the first base station for the terminal in the serving cell provided by the first base station. Optionally, the second base station learns, by using the X2 interface between the second base station and the first base station, an uplink resource adjustment rule of the first base station, then adjusts, according to the uplink resource adjustment rule of the first base station, the uplink resource allocated by the second base station to the terminal in the serving cell provided by the second base station, and further controls, according to the uplink resource allocated by the second base station, the transmit power of the terminal in the serving cell provided by the second base station; or, optionally, the first base station and the second base station may also interact in advance by using the X2 interface to determine an uplink resource allocation algorithm, and the first base station determines, according to the quantity of PRBs for the terminal in the serving cell provided by the second base station and the uplink resource allocation algorithm, a status of uplink resource allocation by the second base station for the terminal, and then allocates an appropriate uplink resource to the terminal according to the status of uplink resource allocation by the second base station for the terminal. For example, if the downlink path loss in the serving cell that is served by the first base station is relatively small, while in the serving cell that is served by the second base station, the downlink path loss is relatively large, uplink resources are relatively few, and an MCS index is relatively small, the first base station may allocate more uplink resources to the terminal in the serving cell provided by the first base station, and then control, according to the uplink resources allocated by the first base station to the terminal, the transmit power of the terminal in the serving cell provided by the first base station.

In conclusion, a process in which the first base station determines, according to the PHR, the resource allocation status of the terminal in the serving cell provided by the first base station or in the serving cell provided by the second base station, and controls transmit power of the terminal according to the resources allocated to the terminal is the same as a process in which the second base station determines, according to the PHR, the resource allocation status of the terminal in the serving cell provided by the first base station or in the serving cell provided by the second base station, and controls transmit power according to the resources allocated to the terminal.

According to the uplink power control method provided in this embodiment of the present invention, a terminal sends a PHR to a first base station, and the first base station adds to the PHR a quantity of PRBs in a serving cell provided by the first base station and forwards the PHR to a second base station, so that the second base station may learn, according to the PHR, wireless conditions of the terminal in the serving cell provided by the first base station and a serving cell provided by the second base station, then dynamically adjust, according to the wireless conditions, an uplink resource allocation status of the terminal in the serving cell provided by the second base station, and further control transmit power of the terminal in the serving cell provided by the second base station. This improves accuracy that a base station controls transmit power of a terminal.

Figure 3:
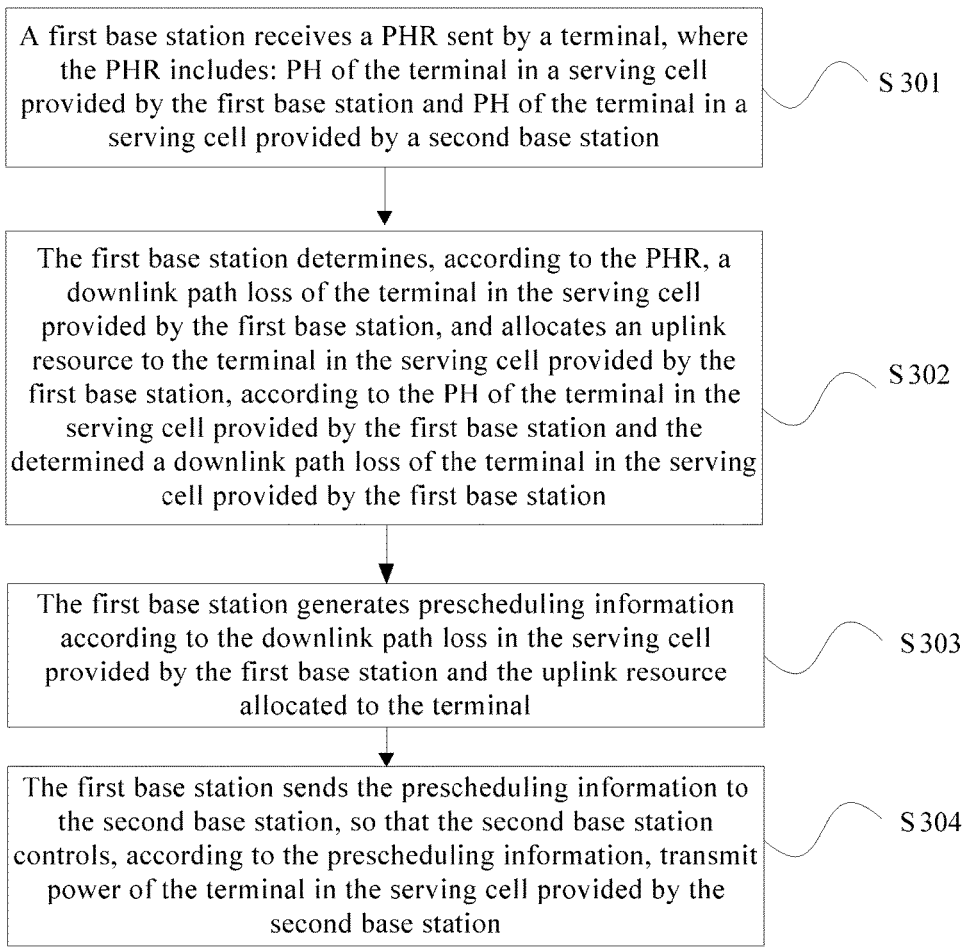
FIG. 3 is a schematic flowchart of Embodiment 3 of the uplink power control method according to the present invention.
Figure 4:
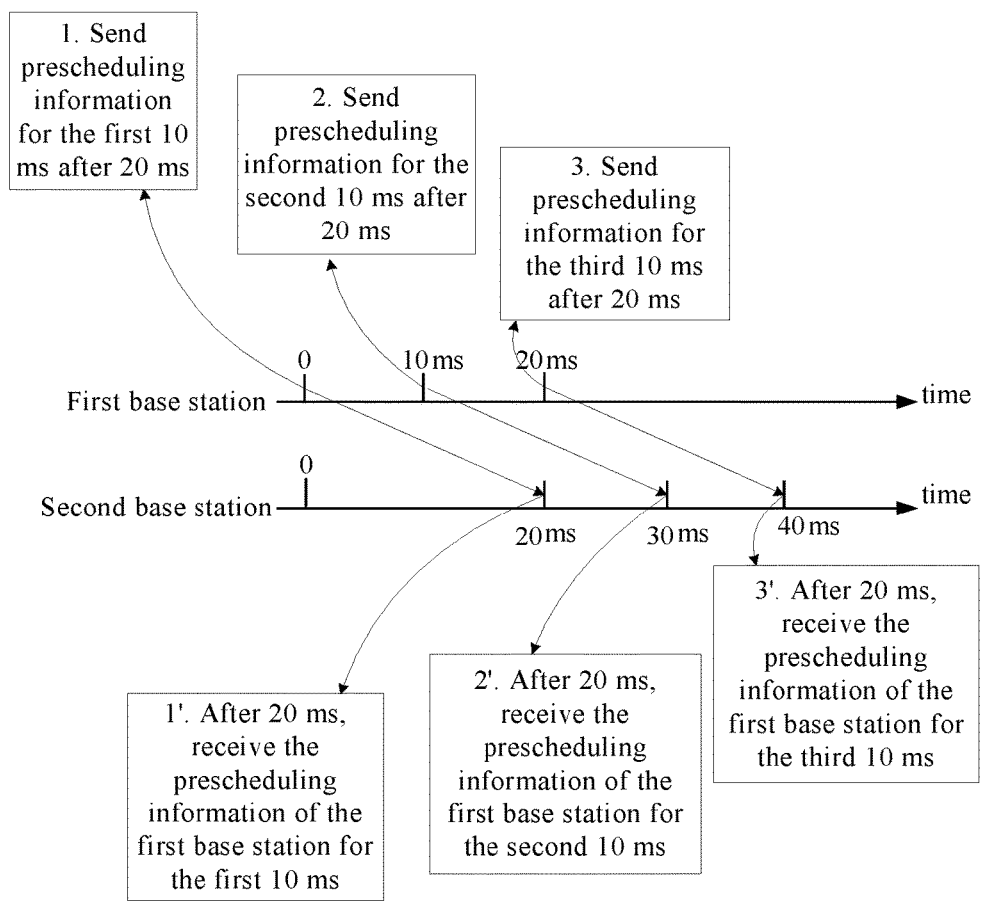
FIG. 4 is a schematic application diagram of Embodiment 3 of the uplink power control method according to the present invention.

FIG. 3 is a schematic flowchart of Embodiment 3 of the uplink power control method according to the present invention. FIG. 4 is a schematic application diagram of Embodiment 3 of the uplink power control method according to the present invention. The method involved in this embodiment is that a first base station generates prescheduling information according to a downlink path loss in a serving cell provided by the first base station and an uplink resource allocated to a terminal, and sends the prescheduling information to a second base station, so that the second base station controls, according to the prescheduling information, transmit power of the terminal in a serving cell provided by the second base station. The method of this embodiment is executed by the first base station, and the downlink path loss that is determined by the first base station according to a PHR is a downlink path loss of the terminal in the serving cell provided by the first base station within a set time period after a first delay has elapsed from the current time. The uplink resource allocated by the first base station to the terminal in the serving cell provided by the first base station is an uplink resource for the terminal in the serving cell provided by the first base station within the set time period after the first delay has elapsed from the current time. The method involved in this embodiment includes the following steps:

S301: A first base station receives a PHR sent by a terminal, where the PHR includes: PH of the terminal in a serving cell provided by the first base station and PH of the terminal in a serving cell provided by a second base station.

Specifically, the terminal sends the PHR to the first base station, and the terminal also sends the PHR to the second base station, where the PHR includes the PH of the terminal in the serving cell provided by the first base station and the PH of the terminal in the serving cell provided by the second base station. Optionally, the PHR may further include maximum transmit power of the terminal in the serving cell provided by the first base station and maximum transmit power of the terminal in the serving cell provided by the second base station.

Generally, the terminal sends data on a PUSCH and/or a PUCCH, where the data includes user data and/or signaling. The PH sent by the terminal to the first base station may be categorized into two types of PH, which are respectively type 1 and type 2. For PH of type 1 (Type1), a calculation formula is $PH=P_{CMAX,c}-P_{PUSCH,c}$ (formula 1), where the formula 1 is specific to a case in which the terminal sends data only on the PUSCH. For PH of type 2 (Type), a calculation formula is $PH=P_{CMAX,c}-P_{PUSCH,c}-P_{PUCCH,c}$ (formula 2), where the formula 2 is specific to a case in which the terminal sends data on both the PUSCH and the PUCCH. $P_{CMAX,c}$ is maximum transmit power of the terminal in a primary cell (Pcell) or an active-state serving cell that is provided by the first base station or the second base station, $P_{PUSCH,c}$ is transmit power of the terminal in the serving cell provided by the first base station or the second base station on the PUSCH, and $P_{PUCCH,c}$ is transmit power of the terminal in the serving cell provided by the first base station or the second base station on the PUCCH. In addition, $P_{CMAX,c}$ may be maximum transmit power based on a status of an allocated uplink resource (maximum transmit power of the terminal known to the first base station is a range, and the terminal needs to report an accurate maximum transmit power value to the first base station), or may be maximum transmit power in a case in which the first base station or the second base station does not allocate an uplink resource to the terminal (this is an upper limit of maximum transmit power that the first base station or the second base station pre-configures for the terminal in the serving cell provided by the first base station or the second base station, where the maximum transmit power of the terminal is the upper limit of maximum transmit power configured by the base station), and in this case, the terminal does not need to report transmit power of the terminal in the serving cell provided by the first base station, and only needs to report uplink power of the terminal in the serving cell provided by the second base station.

S302: The first base station determines, according to the PHR, a downlink path loss of the terminal in the serving cell provided by the first base station, and allocates, according to the PH of the terminal in the serving cell provided by the first base station and the determined downlink path loss of the terminal in the serving cell provided by the first base station, an uplink resource to the terminal in the serving cell provided by the first base station.

S303: The first base station generates prescheduling information according to the downlink path loss in the serving cell provided by the first base station and the uplink resource allocated to the terminal.

S304: The first base station sends the prescheduling information to the second base station, so that the second base station controls, according to the prescheduling information, transmit power of the terminal in the serving cell provided by the second base station.

In this embodiment of the present invention, a case in which the terminal sends data only on a PUSCH is used as an example to describe the entire technical solution. However, the present invention is also applicable to a case in which the terminal sends data on both a PUSCH and a PUCCH, where only formulas that are used are different.

The first base station may obtain, according to the PH that is of the terminal in the serving cell provided by the first base station and is reported by the terminal and maximum transmit power $P_{CMAX,c}$ of the terminal in the serving cell provided by the first base station and by using the formula 1, $P_{PUSCH,c}$ of the terminal in the serving cell provided by the first base station. The maximum transmit power $P_{CMAX,c}$ of the terminal in the serving cell provided by the first base station may be obtained by means of the prior art. Optionally, maximum transmit power of the terminal known to the first base station is a range, and the terminal needs to report to the first base station an accurate maximum transmit power value that falls within this range. Alternatively, the first base station pre-configures an upper limit of maximum transmit power for the terminal in the serving cell provided by the first base station, where the maximum transmit power of the terminal is the upper limit of maximum transmit power configured by the first base station (in this case, the terminal does not need to report the maximum transmit power of the terminal to the first base station). Then, the first base station obtains a downlink path loss of the terminal in the serving cell provided by the first base station, according to a formula 3

$$P_{PUSCH,c}(i) = \min\left\{\begin{array}{l}P_{CMAX,c}(i),\\ 10\log_{10}(M_{PUSCH,c}(i)) + P_{O\_PUSCH,c}(j) + \alpha_c(j) \cdot PL_c\end{array}\right\}$$

and a quantity of PRBs allocated by the first base station to the terminal in the serving cell provided by the first base station (the quantity of PRBs here determines a value of $M_{PUSCH,c}$ (i) in the formula 3), where PL represents a wireless condition in the serving cell in the first base station. It should be noted that in the formula 3, $P_{O\_PUSCH,c}$ (j) is transmit power configured by an upper protocol layer for the terminal, and $\alpha_c(j)$ is a path loss compensation coefficient specific to the serving cell provided by the first base station or the second base station, which are both known to the first base station. In addition, there is a communication delay between the first base station and the second base station. As shown in FIG. 4, duration of a first delay is 20 ms. Therefore, the downlink path loss determined by the first base station according to the PHR is a downlink path loss of the terminal in the serving cell provided by the first base station within a set time period after 20 ms has elapsed from the current time, where the set time period may be 10 ms in FIG. 4. The first base station determines, according to the downlink path loss, an uplink resource allocated by the first base station to the terminal in the serving cell provided by the first base station. Alternatively, the first base station determines $P_{PUSCH,c}$ of the terminal in the serving cell provided by the second base station, according to the PH of the terminal in the serving cell provided by the second base station and transmit power of the terminal in the serving cell provided by the second base station, and in combination with the determined downlink path loss, and allocates an uplink resource to the terminal in the serving cell provided by the first base station, where the uplink resource is an uplink resource for the terminal in the serving cell provided by the first base station within a preset time period after the first delay has elapsed from the current time.

The first base station generates prescheduling information according to the determined uplink path loss and the uplink resource allocated by the first base station to the terminal, where the prescheduling information includes: a quantity of PRBs allocated to the terminal in each subframe in each serving cell provided by the first base station and MSC index information; and optionally, may further include a closed-loop power control parameter of the serving cell provided by the first base station.

The first base station sends at the current time prescheduling information of the first base station for the first 10 ms after 20 ms. After 20 ms, the second base station receives the prescheduling information sent by the first base station. A downlink path loss and an uplink resource allocation status that are with respect to the first base station within the 10 ms and are learned according to the prescheduling information are exactly a status of uplink resource allocation by the first base station at the very moment (because the prescheduling information sent by the first base station to the second base station is itself uplink resource allocation information of the first base station after 20 ms). After 10 ms, the first base station proceeds to send prescheduling information for the second 10 ms to the second base station, and so on. It should be noted that a time length of the first delay needs to be greater than or equal to a transmission delay on an X2 interface between the first base station and the second base station, and may be estimated according to an average delay within a time range, where a value of the first delay may vary with different time ranges.

Further, the second base station receives the prescheduling information sent by the first base station, determines a downlink path loss of the terminal in the serving cell provided by the second base station (for a method for determining, by the second base station, the downlink path loss of the terminal in the serving cell provided by the second base station, reference may be made to the method for determining, by the first base station, the downlink path loss of the terminal in the serving cell provided by the first base station, and details are not described again herein), and allocates an uplink resource to the terminal in the serving cell provided by the second base station with reference to the prescheduling information, thereby achieving an objective of controlling transmit power of the terminal in the serving cell provided by the second base station. For example, the second base station calculates the transmit power of the terminal in the serving cell provided by the first base station according to the received uplink resource allocated by the first base station to the terminal in the serving cell provided by the first base station, calculates, according to the uplink resource allocated by the second base station to the terminal in the serving cell served by the second base station, transmit power of the terminal in the serving cell served by the second base station, and adjusts, according to a preset adjustment rule or algorithm between the first base station and the second base station, transmit power of the terminal in the serving cell served by the second base station, so that a sum of the transmit power of the terminal in the serving cell provided by the first base station and the transmit power of the terminal in the serving cell provided by the second base station does not exceed the maximum transmit power of the terminal.

According to the method provided by the embodiment, a first base station receives a PHR sent by a terminal, determines, according to the PHR, a downlink path loss of the terminal in a serving cell provided by the first base station, allocates, according to the downlink path loss, an uplink resource to the terminal in the serving cell provided by the first base station, and sends prescheduling information to a second base station after generating the prescheduling information according to the downlink path loss of the terminal in the serving cell provided by the first base station and the uplink resource allocated to the terminal in the serving cell provided by the first base station, so that the second base station controls, according to the prescheduling information and a downlink path loss that is of the terminal in a serving cell provided by the second base station and that is determined by the second base station according to the PHR, transmit power of the terminal in the serving cell provided by the second base station. This improves accuracy that a base station controls transmit power of a terminal.

FIG. 5 is a schematic flowchart of Embodiment 4 of the uplink power control method according to the present invention. The method includes the following steps:

S501: A second base station receives a PHR sent by a terminal, where the PHR includes: PH of the terminal in a serving cell provided by a first base station and PH of the terminal in a serving cell provided by the second base station.

Specifically, the terminal separately sends the PHR to the first base station and a second base station, where the PHR includes the PH of the terminal in the serving cell provided by the first base station and the PH of the terminal in the serving cell provided by the second base station. Optionally, the PHR may further include maximum transmit power $P_{CMAX,c}$ of the terminal in the serving cell provided by the first base station and maximum transmit power $P_{CMAX,c}$ of the terminal in the serving cell provided by the second base station. The second base station determines, by using the formula 1 and according to the PH of the terminal in the serving cell provided by the second base station and the maximum transmit power $P_{CMAX,c}$ of the terminal in the serving cell provided by the second base station, $P_{PUSCH,c}$ of the terminal in the serving cell provided by the second base station, and then obtains, according to the formula 3 and a quantity of PRBs allocated by the second base station to the terminal in the serving cell provided by the first base station (the quantity of PRBs herein determines a value of $M_{PUSCH,c}(i)$ in the formula 3, and is known to the second base station), a downlink path loss $PL_c$ of the terminal in the serving cell provided by the second base station.

S502: The second base station receives prescheduling information sent by the first base station, where the prescheduling information is determined by the first base station according to a downlink path loss that is of the terminal in the first base station and that is determined by the first base station and according to an uplink resource that is allocated by the first base station to the terminal in the serving cell provided by the first base station.

S503: The second base station controls, according to the prescheduling information, an uplink resource for the terminal in the serving cell provided by the second base station.

Specifically, the second base station receives the prescheduling information sent by the first base station, where the prescheduling information is generated by the first base station according to the downlink path loss $PL_c$ that is of the terminal in the first base station and that is determined by the first base station and according to the uplink resource allocated by the first base station to the terminal in the serving cell provided by the first base station. A specific method for acquiring the prescheduling information is as follows:

After receiving the PHR sent by the terminal, the first base station may obtain, according to the PH that is of the terminal in the serving cell provided by the first base station and is reported by the terminal and the maximum transmit power $P_{CMAX,c}$ of the terminal in the serving cell provided by the first base station and by using the formula 1, $P_{PUSCH,c}$ of the terminal in the serving cell provided by the first base station. The maximum transmit power $P_{CMAX,c}$ of the terminal in the serving cell provided by the first base station may be obtained by means of the prior art. Optionally, maximum transmit power of the terminal known to the terminal is a range, and the terminal needs to report to the first base station an accurate maximum transmit power value that falls within this range. Alternatively, the first base station pre-configures an upper limit of maximum transmit power for the terminal in the serving cell provided by the first base station, where the maximum transmit power of the terminal is the upper limit value of maximum transmit power configured by the first base station (in this case, the terminal does not need to report the maximum transmit power to the first base station), and then obtains the downlink path loss $PL_c$ of the terminal in the serving cell provided by the first base station according to the formula 3 and a quantity of PRBs allocated by the first base station to the terminal in the serving cell provided by the first base station (the quantity of PRBs herein determines a value $M_{PUSCH,c}(i)$ in the formula 3, and is also known to the first base station). The first base station allocates, according to the downlink path loss $PL_c$ of the terminal in the serving cell provided by the first base station, an uplink resource to the terminal in the serving cell provided by the first base station. It should be noted that, with reference to FIG. 4, the downlink path loss determined by the first base station according to the PHR is a downlink path loss of the terminal in the serving cell provided by the first base station within a set time period after 20 ms has elapsed from the current time, where the set time period herein may be 10 ms in FIG. 4; and that the first base station determines, according to the downlink path loss, a status of the uplink resource allocated by the first base station to the terminal in the serving cell provided by the first base station, where this uplink resource is an uplink resource for the terminal in the serving cell provided by the first base station within a set time period after a first delay has elapsed from the current time. The first base station generates the prescheduling information according to the determined uplink path loss and the uplink resource allocated by the first base station to the terminal, where the prescheduling information includes a quantity of PRBs allocated to the terminal in the serving cell provided by the first base station in each subframe and MCS index information, and where optionally, the prescheduling information may further include a closed-loop power control parameter of the serving cell provided by the first base station and the downlink path loss of the terminal in the serving cell provided by the first base station.

Further, the first base station sends the prescheduling information to the second base station. There is a communication delay between the first base station and the second base station. Therefore, the prescheduling information sent by the first base station at the current time is prescheduling information of the first base station for the first 10 ms after 20 ms; after 20 ms, the second base station receives the prescheduling information sent by the first base station. A downlink path loss and an uplink resource allocation status that are with respect to the first base station within the 10 ms and are learned according to the prescheduling information are exactly a status of uplink resource allocation by the first base station at the very moment (because the prescheduling information sent by the first base station to the second base station is itself uplink resource allocation information of the first base station after 20 ms). After 10 ms, the first base station proceeds to send prescheduling information for the second 10 ms to the second base station, and so on. It should be noted that a time length of the first delay needs to be greater than or equal to a transmission delay on an X2 interface between the first base station and the second base station, and may be estimated according to an average delay within a time range, where a value of the first delay may vary with different time ranges.

Further, the second base station controls transmit power of the terminal in the serving cell provided by the second base station, according to the prescheduling information and the downlink path loss, determined before, of the terminal in the serving cell provided by the second bases station. For example, the second base station calculates transmit power of the terminal in the serving cell provided by the first base station according to the received uplink resource allocated by the first base station to the terminal in the serving cell provided by the first base station, calculates transmit power of the terminal in the serving cell served by the second base station according to an uplink resource allocated by the second base station to the terminal in the serving cell served by the second base station, and adjusts, by using a preset adjustment rule or algorithm between the first base station and the second base station, the transmit power of the terminal in the serving cell served by the second base station, so that a sum of the transmit power of the terminal in the serving cell served by the first base station and the transmit power of the terminal in the serving cell served by the second base station does not exceed the maximum transmit power of the terminal.

According to the method provided by this embodiment, a second base station receives a PHR sent by a terminal, determines a downlink path loss of a terminal in a serving cell provided by the second base station, and controls, with reference to prescheduling information sent by a first base station, transmit power of the terminal in the serving cell provided by the second base station. This improves accuracy that a base station controls transmit power of a terminal.

FIG. 6 is a schematic flowchart of Embodiment 5 of the uplink power control method according to the present invention. The method involved in this embodiment is executed by a terminal. The method includes the following steps:

S601: A terminal sends to a first base station a PHR for the first base station to control transmit power of the terminal in a serving cell provided by the first base station, where the PHR includes: PH of the terminal in the serving cell provided by the first base station, a quantity of PRBs allocated by a second base station to the terminal in a serving cell provided by the second base station, and PH of the terminal in the serving cell provided by the second base station.

S602: The terminal adjusts, under control of the first base station, the transmit power of the terminal in the serving cell provided by the first base station.

Specifically, the first base station sends to the terminal a quantity of PRBs allocated to the terminal in the serving cell provided by first base station, and the second base station sends to the terminal the quantity of PRBs allocated to the terminal in the serving cell provided by the second base station. After receiving the foregoing quantities of PRBs, the terminal triggers the PHR according to a trigger condition, for example, that a periodic PHR timer expires, or that a change of a downlink path loss exceeds a threshold since a serving cell reported a PHR last time. After the terminal triggers the PHR, the terminal sends the PHR to the first base station, where the PHR includes: the PH of the terminal in the serving cell provided by the first base station, the quantity of PRBs allocated by the second base station to the terminal in the serving cell provided by the second base station, and the PH of the terminal in the serving cell provided by the second base station. Optionally, the PHR may further include a quantity of PRBs allocated by the first base station to the terminal in the serving cell provided by the first base station. Moreover, optionally, the terminal may send the PHR to both the first base station and the second base station. For example, a quantity of PRBs is 100, which represents 100 PRBs and requires 7 bits, as shown in Table 1. To reduce a quantity of information bits that the quantity of PRBs occupies, quantities of PRBs may be classified into several levels, for example, eight levels are classified according to a maximum quantity of PRB pairs, where the maximum quantity of PRB pairs is 16, 24, 32, 36, 40, 48, or 50, and therefore only three bits are occupied. A PRB index (PRB index) is used for representation, as shown in Table 2.

After receiving the PHR, the first base station may obtain $P_{PUSCH,c}$ of the terminal in the serving cell provided by the first base station, according to the PH that is of the serving cell provided by the first base station and is reported by the terminal and maximum transmit power $P_{CMAX,c}$ of the terminal in the serving cell provided by the first base station, and then obtain a downlink path loss $PL_c$ of the terminal in the serving cell provided by the first base station, according to the formula 3 and the quantity of PRBs allocated by the first base station to the terminal in the serving cell provided by the first base station, where $PL_c$ represents a wireless condition in the serving cell provided by the first base station. It should be noted that, in the formula 3, $P_{O\_PUSCH,c}(j)$ is transmit power configured by an upper protocol layer for the terminal, and $\alpha_c(j)$ is a path loss compensation coefficient specific to the serving cell provided by the first base station or the second base station, which are both known to the first base station. In addition, $PL_c$ obtained by the first base station according to the formula 3 is a downlink path loss when the terminal sends the current PHR, and the first base station estimates, according to this $PL_c$ obtained by calculation, $PL_c$ when the terminal transmits data in the serving cell provided by the first base station next time. On the other hand, the first base station also obtains $P_{PUSCH,c}$ of the terminal in a subframe i in the serving cell provided by the second base station, according to the formula 1 and according to the PH that is of the terminal in the serving cell provided by the second base station and is reported by the terminal and maximum transmit power $P_{CMAX,c}$ of the terminal in the serving cell provided by the second base station, and then obtains, according to the formula 3 and the quantity of PRBs allocated by the second base station to the terminal in the serving cell provided by the second base station, a downlink path loss $PL_c$ when the terminal transmits data in the serving cell provided by the second base station, where the downlink path loss $PL_c$ of the terminal in the serving cell provided by the second base station represents a wireless condition in the serving cell provided by the second base station, and $PL_c$, obtained by the first base station according to the formula 3, when the terminal transmits data in the serving cell provided by the second base station is a downlink path loss when the terminal sends the current PHR. The first base station estimates, according to this $PL_c$ obtained by calculation, $PL_c$ when the terminal transmits data in the serving cell provided by the second base station next time.

After the first base station obtains the downlink path loss $PL_c$ when the terminal transmits data in the serving cell provided by the first base station next time, the first base station allocates an uplink resource to the terminal in the serving cell provided by the first base station, according to the PH of the terminal in the serving cell provided by the first base station and the downlink path loss $PL_c$ when the terminal transmits data in the serving cell provided by the second base station next time. In addition, the first base station further estimates, according to the downlink path loss $PL_c$ when the terminal transmits data in the serving cell provided by the second base station next time and the PH of the terminal in the serving cell provided by the second base station, a status of uplink resource allocation by the second base station for the terminal in the serving cell provided by the second base station. The first base station learns, by using an X2 interface between the first base station and the second base station, an uplink resource adjustment rule of the second base station, then adjusts, according to the uplink resource adjustment rule of the second base station, an uplink resource allocated by the first base station to the terminal in the serving cell provided by the first base station, and further controls, according to the uplink resource allocated by the first base station to the terminal, transmit power of the terminal in the serving cell provided by the first base station. That is, the terminal adjusts, according to the uplink resource allocated by the first base station, the transmit power of the terminal in the serving cell provided by the first base station. Alternatively, the first base station and the second base station may also interact in advance by using the X2 interface to determine an uplink resource allocation algorithm, and the first base station determines, according to the quantity of PRBs for the terminal in the serving cell provided by the second base station and the uplink resource allocation algorithm, a status of uplink resource allocation by the second base station for the terminal, and then allocates an appropriate uplink resource to the terminal according to the status of uplink resource allocation by the second base station for the terminal. For example, if the downlink path loss in the serving cell that is served by the first base station is relatively small, while in the serving cell that is served by the second base station, the downlink path loss is relatively large, uplink resources are relatively few, and an MCS index is relatively small, the first base station may allocate more uplink resources to the terminal in the serving cell provided by the first base station, and then control, according to the uplink resources allocated by the first base station to the terminal, the transmit power of the terminal in the serving cell provided by the first base station.

According to the uplink power control method provided in this embodiment of the present invention, a terminal sends a PHR to a first base station, where the PHR carries PH of the terminal in the serving cell provided by the first base station, a quantity of PRBs allocated by a second base station to the terminal in a serving cell provided by the second base station, and PH of the terminal in the serving cell provided by the second base station, so that the first base station can learn wireless conditions of the terminal in serving cells of the first base station and the second base station according to the PHR, then dynamically adjust, according to the wireless conditions, an uplink resource allocation status of the terminal in the serving cell provided by the first base station, and further control transmit power of the terminal in the serving cell provided by the first base station. This improves accuracy that a base station controls transmit power of a terminal.

Further, on the basis of the foregoing embodiment, the method further includes that the terminal adjusts, under control of the second base station, transmit power of the terminal in the serving cell provided by the second base station, where the control of the second base station is determined by the second base station according to a PHR sent by the first base station to the second base station.

Specifically, the first base station and the second base station determine uplink resource allocation statuses and adjustment statuses of the terminal in the serving cells they respectively serve according to the downlink path losses when the terminal transmits data in the serving cells they respectively serve. After estimating, according to the PHR forwarded by the first base station, the downlink path loss when the terminal transmits data in the serving cell provided by the second base station next time, and estimating the downlink path loss when the terminal transmits data in the serving cell provided by the first base station next time, the second base station allocates an uplink resource to the terminal in the serving cell provided by the second base station. That is, a status of uplink resource allocation by the second base station for the terminal in the serving cell provided by the second base station is related to the PHR that is sent by the first base station to the second base station, and the terminal adjusts, according to the uplink resource allocated by the second base station to the terminal, transmit power of the terminal in the serving cell provided by the second base station.

Further, on the basis of the foregoing embodiment, the PHR further includes: data MCS index information of the serving cell provided by the second base station and/or a closed-loop power control parameter of the serving cell provided by the second base station.

Specifically, the PHR that the terminal sends to the first base station may further include: the data MCS index information of the serving cell provided by the second base station and/or the closed-loop power control parameter of the serving cell provided by the second base station. The MCS index information herein is corresponding to $\Delta_{TF,c}(i)$ in the formula 4, and the closed-loop power control parameter of the serving cell provided by the second base station is corresponding to $f_c(i)$ in the formula 4. The MCS index information may represent different data modulation and coding schemes, and in a case in which radio quality in a serving cell is unstable, different modulation and coding schemes affect transmit power of the terminal.

The first base station obtains $P_{PUSCH,c}$ of the terminal in the subframe i in the serving cell provided by the first base station, according to the PH that is of the terminal in the serving cell provided by the first base station and is reported by the terminal and maximum transmit power $P_{CMAX,c}$ of the terminal in the serving cell provided by the first base station, and according to the formula 1, and then obtains, by using the formula 4 and according to a quantity of PRBs allocated by the first base station to the terminal in the serving cell provided by the first base station, a downlink path loss $PL_c$ when the terminal transmits data in the serving cell provided by the first base station, where the downlink path loss $PL_c$ of the terminal in the serving cell provided by the first base station represents a wireless condition of the terminal in the serving cell provided by the first base station. In addition, $PL_c$ obtained by the first base station according to the formula 4 is a downlink path loss when the terminal sends the current PHR, and the first base station estimates, according to this $PL_c$ obtained by calculation, $PL_c$ when the terminal transmits data in the serving cell provided by the first base station next time. On the other hand, the first base station also obtains, according to the PH that is of the terminal in the serving cell provided by the second base station and is reported by the terminal and maximum transmit power $P_{CMAX,c}$ of the terminal in the serving cell provided by the second base station and according to the formula 1, $P_{PUSCH,c}$ of the terminal in the subframe i in the serving cell provided by the second base station, and then obtains, according to the formula 4 and the quantity of PRBs allocated by the second base station to the terminal in the serving cell provided by the second base station, a downlink path loss $PL_c$ when the terminal transmits data in the serving cell provided by the second base station, where the downlink path loss $PL_c$ of the terminal in the serving cell provided by the second base station represents a wireless condition of the terminal in the serving cell provided by the second base station. It should be noted that, in the formula 4, $P_{O\_PUSCH,c}(j)$, $\alpha_c(j)$, $\Delta_{TF,c}(i)$, and $f_c(i)$ are all known to the first base station. In addition, $PL_c$ obtained by the first base station according to the formula 4 is a downlink path loss when the terminal sends the current PHR, and the first base station estimates, according to this $PL_c$ obtained by calculation, $PL_c$ when the terminal transmits data in the serving cell provided by the second base station next time. And then, the first base station allocates an uplink resource to the terminal according to the determined downlink path loss of the terminal in the serving cell provided by the first base station and the determined downlink path loss of the terminal in the serving cell provided by the second base station, and controls transmit power of the terminal according to the uplink resource allocated to the terminal.

According to the method provided in this embodiment of the present invention, the PHR further carries the MCS index information and the closed-loop power control parameter, so that the first base station can learn wireless conditions of the terminal in the serving cells of the first base station and the second base station, dynamically adjust, according to the wireless conditions, the uplink resource allocation status of the terminal in the serving cell provided by the first base station, and further control transmit power of the terminal in the serving cell provided by the first base station. This improves accuracy that a base station controls transmit power of a terminal.

A person of ordinary skill in the art may understand that all or some of the steps of the method embodiments may be implemented by a program instructing relevant hardware. The foregoing program may be stored in a computer-readable storage medium. When the program runs, the steps of the method embodiments are performed. The foregoing storage medium includes any medium that can store program code, such as a ROM, a RAM, a magnetic disk, or an optical disc.

Figure 7:
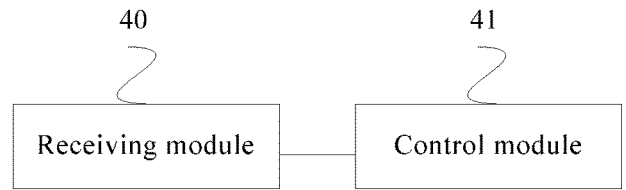
FIG. 7 is a schematic structural diagram of Embodiment 1 of a base station according to the present invention.

FIG. 7 is a schematic structural diagram of Embodiment 1 of a base station according to the present invention. As shown in FIG. 7, the base station includes: a receiving module 40, configured to receive a power headroom report PHR sent by a terminal, where the PHR includes: power headroom PH of the terminal in a serving cell provided by a first base station, a quantity of physical resource blocks PRBs allocated by a second base station to the terminal in a serving cell provided by the second base station, and PH of the terminal in the serving cell provided by the second base station; and a control module 41, configured to control transmit power of the terminal in the serving cell provided by the first base station.

The base station in this embodiment can execute the method embodiment shown in FIG. 1. Implementation principles thereof are similar, and details are not described herein again.

Figure 8:
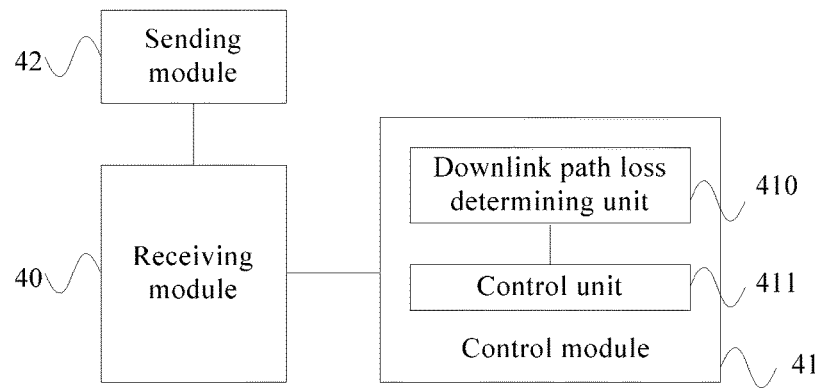
FIG. 8 is a schematic structural diagram of Embodiment 2 of the base station according to the present invention.

FIG. 8 is a schematic structural diagram of Embodiment 2 of the base station according to the present invention. As shown in FIG. 8, on the basis of the embodiment shown in FIG. 7, further, the control module 41 includes: a downlink path loss determining unit 410, configured to determine, according to the PHR, a downlink path loss of the terminal in the serving cell provided by the first base station and a downlink path loss of the terminal in the serving cell provided by the second base station; and a control unit 411, configured to: allocate, to the terminal, an uplink resource for the terminal in the serving cell provided by the first base station, according to the PH of the terminal in the serving cell provided by the first base station, the downlink path loss of the terminal in the serving cell provided by the first base station, the PH of the terminal in the serving cell provided by the second base station, and the downlink path loss of the terminal in the serving cell provided by the second base station, and control, according to the uplink resource for the terminal in the serving cell provided by the first base station, transmit power of the terminal in the serving cell provided by the first base station.

Further, on the basis of the foregoing embodiment, the downlink path loss determining unit 410 is specifically configured to determine the downlink path loss of the terminal in the serving cell provided by the first base station, according to a quantity of PRBs allocated by the first base station to the terminal in the serving cell provided by the first base station, the PH of the terminal in the serving cell provided by the first base station, and maximum transmit power of the terminal in the serving cell provided by the first base station; and is further configured to determine the downlink path loss of the terminal in the serving cell provided by the second base station, according to the quantity of PRBs allocated by the second base station to the terminal in the serving cell provided by the second base station, the PH of the terminal in the serving cell provided by the second base station, and maximum transmit power of the terminal in the serving cell provided by the second base station.

Further, the PHR further includes: data modulation and coding scheme MCS index information of the serving cell provided by the second base station and/or a closed-loop power control parameter of the serving cell provided by the second base station. The downlink path loss determining unit 410 is specifically configured to determine the downlink path loss of the terminal in the serving cell provided by the first base station, according to a quantity of PRBs allocated by the first base station to the terminal in the serving cell provided by the first base station, the PH of the terminal in the serving cell provided by the first base station, maximum transmit power of the terminal in the serving cell provided by the first base station, and MCS index information of the serving cell provided by the first base station and/or a closed-loop power control parameter of a serving cell provided by the first base station; and is further configured to determine the downlink path loss of the terminal in the serving cell provided by the second base station, according to the quantity of PRBs allocated by the second base station to the terminal in the serving cell provided by the second base station, the PH of the terminal in the serving cell provided by the second base station, maximum transmit power of the terminal in the serving cell provided by the second base station, and the MCS index information of the serving cell provided by the second base station and/or the closed-loop power control parameter of the serving cell provided by the second base station.

The base station provided in this embodiment can execute the foregoing method embodiments. Implementation principles thereof are similar, and details are not described herein again.

Further, on the basis of the embodiment shown in FIG. 8, the base station further includes: a sending module 42, configured to: after the receiving module receives the power headroom report PHR sent by the terminal, send the PHR to the second base station, so that the second base station controls, according to the PHR, transmit power of the terminal in the serving cell provided by the second base station. In addition, the sending module 42 is further configured to: before sending the PHR to the second base station, add, to the PHR, the quantity of PRBs allocated by the first base station to the terminal in the serving cell provided by the first base station; or, the quantity of PRBs allocated by the first base station to the terminal in the serving cell provided by the first base station and the MCS index information of the serving cell provided by the first base station; or, the quantity of PRBs allocated by the first base station to the terminal in the serving cell provided by the first base station and the closed-loop power control parameter of the first base station; or, the quantity of PRBs allocated by the first base station to the terminal in the serving cell provided by the first base station, the MCS index information of the serving cell provided by the first base station, and the closed-loop power control parameter of the first base station.

The base station provided in this embodiment can execute the foregoing method embodiments. Implementation principles thereof are similar, and details are not described herein again.

Figure 9:
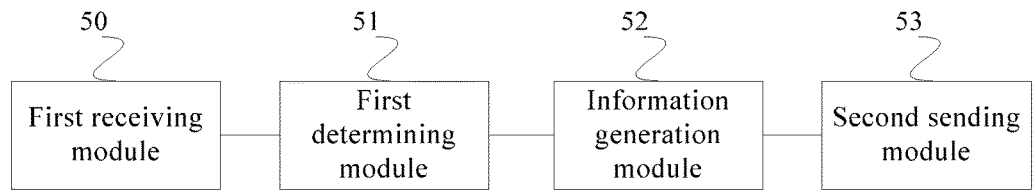
FIG. 9 is a schematic structural diagram of Embodiment 1 of a first base station according to the present invention.

FIG. 9 is a schematic structural diagram of Embodiment 1 of a first base station according to the present invention. As shown in FIG. 9, the first base station includes: a first receiving module 50, configured to receive a PHR sent by a terminal, where the PHR includes: PH of the terminal in a serving cell provided by the first base station and PH of the terminal in a serving cell provided by a second base station; a first determining module 51, configured to determine, according to the PHR, a downlink path loss of the terminal in the serving cell provided by the first base station, and allocate, according to the PH of the terminal in the serving cell provided by the first base station and the determined downlink path loss of the terminal in the serving cell provided by the first base station, an uplink resource to the terminal in the serving cell provided by the first base station; an information generation module 52, configured to generate prescheduling information according to the downlink path loss in the serving cell provided by the first base station and the uplink resource allocated to the terminal; and a second sending module 53, configured to send the prescheduling information to the second base station, so that the second base station controls, according to the prescheduling information, transmit power of the terminal in the serving cell provided by the second base station.

The first base station provided in this embodiment can execute the foregoing method embodiment shown in FIG. 3. Implementation principles thereof are similar, and details are not described herein again.

Figure 10:
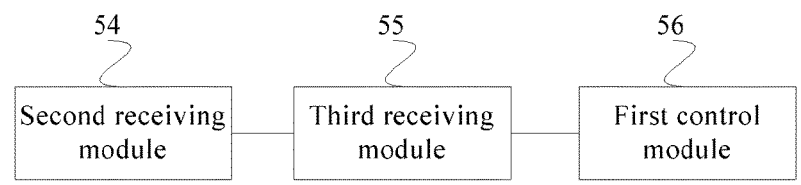
FIG. 10 is a schematic structural diagram of Embodiment 1 of a second base station according to the present invention.

FIG. 10 is a schematic structural diagram of Embodiment 1 of a second base station according to the present invention. As shown in FIG. 10, the second base station includes: a second receiving module 54, configured to receive a PHR sent by a terminal, where the PHR includes: PH of the terminal in a serving cell provided by a first base station and PH of the terminal in a serving cell provided by the second base station; a third receiving module 55, configured to receive prescheduling information sent by the first base station, where the prescheduling information is determined by the second base station according to a downlink path loss that is of the terminal in the first base station and that is determined by the first base station and according to an uplink resource allocated by the first base station to the terminal in the serving cell provided by the first base station; and a first control module 56, configured to control, according to the prescheduling information, an uplink resource for the terminal in the serving cell provided by the second base station.

The second base station provided in this embodiment can execute the foregoing method embodiment shown in FIG. 5. Implementation principles thereof are similar, and details are not described herein again.

Figure 11:
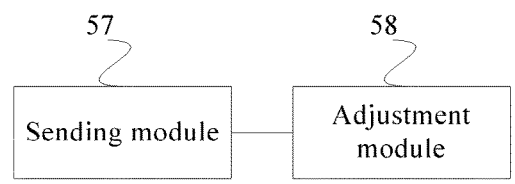
FIG. 11 is a schematic structural diagram of Embodiment 1 of a terminal according to the present invention.

FIG. 11 is a schematic structural diagram of Embodiment 1 of a terminal according to the present invention. As shown in FIG. 11, the terminal includes: a sending module 57, configured to send to a first base station a power headroom report PHR for the first base station to control transmit power of the terminal in a serving cell provided by the first base station, where the PHR includes: power headroom PH of the terminal in the serving cell provided by the first base station, a quantity of physical resource blocks PRBs allocated by a second base station to the terminal in a serving cell provided by the second base station, and power headroom PH of the terminal in the serving cell provided by the second base station; and an adjustment module 58, configured to adjust, under control of the first base station, the transmit power of the terminal in the serving cell provided by the first base station.

The terminal provided in this embodiment can execute the foregoing method embodiment shown in FIG. 6. Implementation principles thereof are similar, and details are not described herein again.

Further, on the basis of the terminal embodiment, the adjustment module 58 is further configured to adjust, under control of the second base station, transmit power of the terminal in the serving cell provided by the second base station, where the control of the second base station is determined by the second base station according to a PHR that is sent by the first base station to the second base station, where the PHR further includes: data modulation and coding scheme MCS index information of the serving cell provided by the second base station and/or a closed-loop power control parameter of the serving cell provided by the second base station.

The terminal provided in this embodiment can execute the foregoing method embodiments. Implementation principles thereof are similar, and details are not described herein again.

Figure 12:
FIG. 12 is a schematic structural diagram of Embodiment 3 of the base station according to the present invention.

FIG. 12 is a schematic structural diagram of Embodiment 3 of the base station according to the present invention. As shown in FIG. 12, the base station includes: a receiver 60 and a processor 61.

The receiver 60 is configured to receive a power headroom report PHR sent by a terminal, where the PHR includes: power headroom PH of the terminal in a serving cell provided by a first base station, a quantity of physical resource blocks PRBs allocated by the second base station to the terminal in a serving cell provided by the second base station, and PH of the terminal in the serving cell provided by the second base station.

The processor 61 is configured to control transmit power of the terminal in the serving cell provided by the first base station.

The base station provided in this embodiment can execute the foregoing method embodiments. Implementation principles thereof are similar, and details are not described herein again.

On the basis of the embodiment shown in FIG. 12, optionally, the PHR further includes maximum transmit power of the terminal in the serving cell provided by the second base station.

Optionally, the processor 61 is further configured to determine, according to the PHR, a downlink path loss of the terminal in the serving cell provided by the first base station and a downlink path loss of the terminal in the serving cell provided by the second base station; and is further configured to: allocate, to the terminal, an uplink resource for the terminal in the serving cell provided by the first base station, according to the PH of the terminal in the serving cell provided by the first base station, the downlink path loss of the terminal in the serving cell provided by the first base station, the PH of the terminal in the serving cell provided by the second base station, and the downlink path loss of the terminal in the serving cell provided by the second base station, and control, according to the uplink resource for the terminal in the serving cell provided by the first base station, the transmit power of the terminal in the serving cell provided by the first base station.

Optionally, the processor 61 may further be configured to determine the downlink path loss of the terminal in the serving cell provided by the first base station, according to a quantity of PRBs allocated by the first base station to the terminal in the serving cell provided by the first base station, the PH of the terminal in the serving cell provided by the first base station, and maximum transmit power of the terminal in the serving cell provided by the first base station; and further be configured to determine the downlink path loss of the terminal in the serving cell provided by the second base station, according to the quantity of PRBs allocated by the second base station to the terminal in the serving cell provided by the second base station, the PH of the terminal in the serving cell provided by the second base station, and maximum transmit power of the terminal in the serving cell provided by the second base station.

Optionally, the processor 61 may further be configured to determine the downlink path loss of the terminal in the serving cell provided by the first base station, according to a quantity of PRBs allocated by the first base station to the terminal in the serving cell provided by the first base station, the PH of the terminal in the serving cell provided by the first base station, maximum transmit power of the terminal in the serving cell provided by the first base station, and MCS index information of the serving cell provided by the first base station and/or a closed-loop power control parameter of a serving cell provided by the first base station; and further be configured to determine the downlink path loss of the terminal in the serving cell provided by the second base station, according to the quantity of PRBs allocated by the second base station to the terminal in the serving cell provided by the second base station, the PH of the terminal in the serving cell provided by the second base station, maximum transmit power of the terminal in the serving cell provided by the second base station, and MCS index information of the serving cell provided by the second base station and/or a closed-loop power control parameter of the serving cell provided by the second base station.

Figure 13:
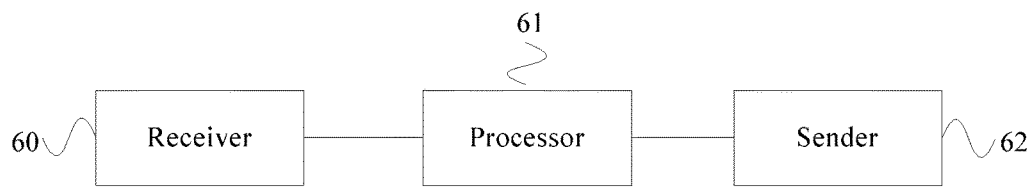
FIG. 13 is a schematic structural diagram of Embodiment 4 of the base station according to the present invention.

FIG. 13 is a schematic structural diagram of Embodiment 4 of the base station according to the present invention. On the basis of the embodiment shown in FIG. 12, the base station further includes a sender 62, configured to: after the receiver 60 receives the power headroom report PHR sent by the terminal, send the PHR to the second base station, so that the second base station controls, according to the PHR, transmit power of the terminal in the serving cell provided by the second base station.

Optionally, the sender 62 is further configured to: before sending the PHR to the second base station, add, to the PHR, the quantity of PRBs allocated by the first base station to the terminal in the serving cell provided by the first base station; or, the quantity of PRBs allocated by the first base station to the terminal in the serving cell provided by the first base station and the MCS index information of the serving cell provided by the first base station; or, the quantity of PRBs allocated by the first base station to the terminal in the serving cell provided by the first base station and the closed-loop power control parameter of the first base station; or, the quantity of PRBs allocated by the first base station to the terminal in the serving cell provided by the first base station, the MCS index information of the serving cell provided by the first base station, and the closed-loop power control parameter of the first base station.

The base station provided in this embodiment can execute the foregoing method embodiments. Implementation principles thereof are similar, and details are not described herein again.

Figure 14:
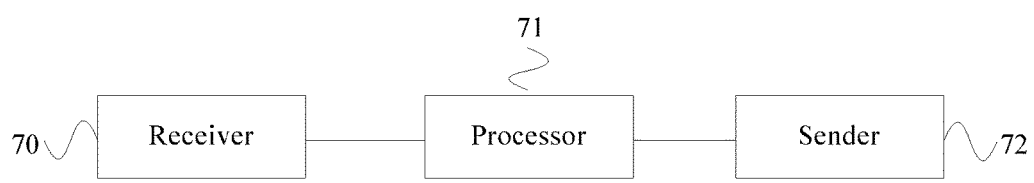
FIG. 14 is a schematic structural diagram of Embodiment 2 of the first base station according to the present invention.

FIG. 14 is a schematic structural diagram of Embodiment 2 of the first base station according to the present invention. As shown in FIG. 14, the first base station includes: a receiver 70, configured to receive a PHR sent by a terminal, where the PHR includes: PH of the terminal in a serving cell provided by the first base station and PH of the terminal in a serving cell provided by a second base station; a processor 71, configured to determine, according to the PHR, a downlink path loss of the terminal in the serving cell provided by the first base station, and allocate, according to the PH of the terminal in the serving cell provided by the first base station and the determined downlink path loss of the terminal in the serving cell provided by the first base station, an uplink resource to the terminal in the serving cell provided by the first base station, and further configured to generate prescheduling information according to the downlink path loss in the serving cell provided by the first base station and the uplink resource allocated to the terminal; and a sender 72, configured to send the prescheduling information to the second base station, so that the second base station controls, according to the prescheduling information, transmit power of the terminal in the serving cell provided by the second base station.

The base station provided in this embodiment can execute the foregoing method embodiment shown in FIG. 9. Implementation principles thereof are similar, and details are not described herein again.

Figure 15:
FIG. 15 is a schematic structural diagram of Embodiment 2 of the second base station according to the present invention.

FIG. 15 is a schematic structural diagram of Embodiment 2 of the second base station according to the present invention. As shown in FIG. 15, the second base station includes: a receiver 80, configured to receive a PHR sent by a terminal, where the PHR includes: PH of the terminal in a serving cell provided by a first base station and PH of the terminal in a serving cell provided by the second base station, and further configured to receive prescheduling information sent by the first base station, where the prescheduling information is determined by the second base station according to a downlink path loss that is of the terminal in the first base station and that is determined by the first base station and according to an uplink resource allocated by the first base station to the terminal in the serving cell provided by the first base station; and a processor 81, configured to control, according to the prescheduling information, an uplink resource for the terminal in the serving cell provided by the second base station.

The base station provided in this embodiment can execute the foregoing method embodiment shown in FIG. 10. Implementation principles thereof are similar, and details are not described herein again.

Figure 16:
FIG. 16 is a schematic structural diagram of Embodiment 2 of the terminal according to the present invention.

FIG. 16 is a schematic structural diagram of Embodiment 2 of the terminal according to the present invention. As shown in FIG. 16, the terminal includes: a sender 90, configured to send to a first base station a power headroom report PHR for the first base station to control transmit power of the terminal in a serving cell provided by the first base station, where the PHR includes: power headroom PH of the terminal in the serving cell provided by the first base station, a quantity of physical resource blocks PRBs allocated by a second base station to the terminal in a serving cell provided by the second base station, and PH of the terminal in the serving cell provided by the second base station; and a processor 91, configured to adjust, under control of the first base station, the transmit power of the terminal in the serving cell provided by the first base station.

The terminal provided in this embodiment can execute the foregoing method embodiments. Implementation principles thereof are similar, and details are not described herein again.

Optionally, the processor 91 is further configured to adjust, under control of the second base station, transmit power of the terminal in the serving cell provided by the second base station, where the control of the second base station is determined by the second base station according to a PHR that is sent by the first base station to the second base station, where the PHR further includes: data modulation and coding scheme MCS index information of the serving cell provided by the second base station and/or a closed-loop power control parameter of the serving cell provided by the second base station.

The terminal provided in this embodiment can execute the foregoing method embodiments. Implementation principles thereof are similar, and details are not described herein again.

Finally, it should be noted that the foregoing embodiments are merely intended to describe the technical solutions of the present invention, but not to limit the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An uplink power control method, comprising:
receiving, by a first base station, a power headroom report (PHR) sent by a terminal, wherein the PHR comprises power headroom (PH) of the terminal in a first serving cell provided by the first base station, a quantity of physical resource blocks PRBs allocated by a second base station to the terminal in a second serving cell provided by the second base station, and PH of the terminal in the second serving cell provided by the second base station; and
controlling, by the first base station and according to the PHR, transmit power of the terminal in the first serving cell provided by the first base station.

2. The method according to claim 1, wherein the PHR further comprises maximum transmit power of the terminal in the second serving cell provided by the second base station.

3. The method according to claim 1, wherein the controlling transmit power of the terminal comprises:
determining, by the first base station and according to the PHR, a downlink path loss of the terminal in the first serving cell provided by the first base station and a downlink path loss of the terminal in the second serving cell provided by the second base station; and
allocating, by the first base station and to the terminal, an uplink resource for the terminal in the first serving cell provided by the first base station, according to the PH of the terminal in the serving cell provided by the first base station, further according to the downlink path loss of the terminal in the first serving cell provided by the first base station, further according to the PH of the terminal in the second serving cell provided by the second base station, and further according to the downlink path loss of the terminal in the second serving cell provided by the second base station.

4. The method according to claim 3, wherein the determining a downlink path loss of the terminal in the first serving cell provided by the first base station and a downlink path loss of the terminal in the second serving cell provided by the second base station comprises:
determining, by the first base station, the downlink path loss of the terminal in the first serving cell provided by the first base station according to a quantity of PRBs allocated by the first base station to the terminal in the serving cell provided by the first base station, further according to the PH of the terminal in the serving cell provided by the first base station, and further according to maximum transmit power of the terminal in the serving cell provided by the first base station; and
determining, by the first base station, the downlink path loss of the terminal in the second serving cell provided by the second base station according to the quantity of PRBs allocated by the second base station to the terminal in the second serving cell provided by the second base station, further according to the PH of the terminal in the second serving cell provided by the second base station, and further according to maximum transmit power of the terminal in the second serving cell provided by the second base station.

5. The method according to claim 3, wherein the PHR further comprises at least one of data modulation and coding scheme (MCS) index information of the second serving cell provided by the second base station and a closed-loop power control parameter of the second serving cell provided by the second base station; and
wherein the determining the downlink path loss of the terminal in the first serving cell provided by the first base station and a downlink path loss of the terminal in the second serving cell provided by the second base station comprises:
determining, by the first base station, the downlink path loss of the terminal in the first serving cell provided by the first base station according to a quantity of PRBs allocated by the first base station to the terminal in the first serving cell provided by the first base station, further according to the PH of the terminal in the first serving cell provided by the first base station, further according to maximum transmit power of the terminal in the first serving cell provided by the first base station, and further according to at least one of the MCS index information of the first serving cell provided by the first base station and the closed-loop power control parameter of the first serving cell provided by the first base station; and
determining, by the first base station, the downlink path loss of the terminal in the second serving cell provided by the second base station according to the quantity of PRBs allocated by the second base station to the terminal in the second serving cell provided by the second base station, further according to the PH of the terminal in the second serving cell provided by the second base station, further according to maximum transmit power of the terminal in the second serving cell provided by the second base station, and further according to at least one of the MCS index information of the second serving cell provided by the second base station and the closed-loop power control parameter of the second serving cell provided by the second base station.

6. The method according to claim 5, wherein the method further comprises:
sending, by the first base station, the PHR to the second base station, so that the second base station controls, according to the PHR, transmit power of the terminal in the second serving cell provided by the second base station.

7. The method according to claim 6, wherein the method further comprises:
adding, by the first base station to the PHR, at least one of:
the quantity of PRBs allocated by the first base station to the terminal in the first serving cell provided by the first base station;
the quantity of PRBs allocated by the first base station to the terminal in the first serving cell provided by the first base station and the MCS index information of the first serving cell provided by the first base station;
the quantity of PRBs allocated by the first base station to the terminal in the first serving cell provided by the first base station and the closed-loop power control parameter of the first base station; and
the quantity of PRBs allocated by the first base station to the terminal in the first serving cell provided by the first base station, the MCS index information of the first serving cell provided by the first base station, and the closed-loop power control parameter of the first base station.

8. An uplink power control method, comprising:
sending, by a terminal to a first base station, a power headroom report (PHR) for the first base station to control transmit power of the terminal in a first serving cell provided by the first base station, wherein the PHR comprises power headroom (PH) of the terminal in the first serving cell provided by the first base station, a quantity of physical resource blocks PRBs allocated by a second base station to the terminal in a second serving cell provided by the second base station, and PH of the terminal in the second serving cell provided by the second base station; and
adjusting, by the terminal under control of the first base station, the transmit power of the terminal in the first serving cell provided by the first base station.

9. The method according to claim 8, wherein the method further comprises adjusting, by the terminal under control of the second base station, transmit power of the terminal in the second serving cell provided by the second base station, wherein the control of the second base station is determined by the second base station according to the PHR that is sent by the first base station to the second base station.

10. The method according to claim 9, wherein the PHR further comprises at least one of data modulation and coding scheme (MCS) index information of the second serving cell provided by the second base station and a closed-loop power control parameter of the second serving cell provided by the second base station.

11. A base station, comprising:
a receiving module configured to receive a power headroom report (PHR) sent by a terminal, wherein the PHR comprises power headroom (PH) of the terminal in a serving cell provided by a first base station, a quantity of physical resource blocks PRBs allocated by a second base station to the terminal in a second serving cell provided by the second base station, and PH of the terminal in the second serving cell provided by the second base station; and
a processor connected to the receiving module; and
a non-transitory computer readable medium connected to the processor and having stored thereon instructions that, when executed by the processor, cause the base station to:
control, according to the PHR, transmit power of the terminal in the first serving cell provided by the first base station.

12. The base station according to claim 11, wherein the PHR further comprises maximum transmit power of the terminal in the second serving cell provided by the second base station.

13. The base station according to claim 11, wherein the instructions causing the base station to control the transmit power comprise instructions that, when executed by the processor, cause the base station to:
determine, according to the PHR, a downlink path loss of the terminal in the first serving cell provided by the first base station and a downlink path loss of the terminal in the second serving cell provided by the second base station; and
allocate, to the terminal, an uplink resource for the terminal in the first serving cell provided by the first base station according to the PH of the terminal in the first serving cell provided by the first base station, further according to the downlink path loss of the terminal in the first serving cell provided by the first base station, further according to the PH of the terminal in the second serving cell provided by the second base station, and further according to the downlink path loss of the terminal in the second serving cell provided by the second base station.

14. The base station according to claim 13, wherein the instructions causing the base station to determine the downlink path loss comprise instructions that, when executed by the processor, cause the base station to:
determine the downlink path loss of the terminal in the first serving cell provided by the first base station according to a quantity of PRBs allocated by the first base station to the terminal in the first serving cell provided by the first base station, further according to the PH of the terminal in the first serving cell provided by the first base station, and further according to maximum transmit power of the terminal in the first serving cell provided by the first base station; and
determine the downlink path loss of the terminal in the second serving cell provided by the second base station according to the quantity of PRBs allocated by the second base station to the terminal in the second serving cell provided by the second base station, further according to the PH of the terminal in the second serving cell provided by the second base station, and further according to maximum transmit power of the terminal in the second serving cell provided by the second base station.

15. The base station according to claim 13, wherein the PHR further comprises at least one of data modulation and coding scheme (MCS) index information of the second serving cell provided by the second base station and a closed-loop power control parameter of the second serving cell provided by the second base station; and
wherein the instructions causing the base station to determine the downlink path loss comprise instructions that, when executed by the processor, cause the base station to:
determine the downlink path loss of the terminal in the first serving cell provided by the first base station according to a quantity of PRBs allocated by the first base station to the terminal in the first serving cell provided by the first base station, further according to the PH of the terminal in the first serving cell provided by the first base station, further according to maximum transmit power of the terminal in the first serving cell provided by the first base station, and further according to at least one of the MCS index information of the first serving cell provided by the first base station and the closed-loop power control parameter of a first serving cell provided by the first base station; and
determine the downlink path loss of the terminal in the second serving cell provided by the second base station according to the quantity of PRBs allocated by the second base station to the terminal in the second serving cell provided by the second base station, further according to the PH of the terminal in the second serving cell provided by the second base station, further according to maximum transmit power of the terminal in the second serving cell provided by the second base station, and further according to at least one of the MCS index information of the second serving cell provided by the second base station and the closed-loop power control parameter of the second serving cell provided by the second base station.

16. The base station according to claim 15, wherein the base station further comprises:
a sending module configured to after the receiving module receives the PHR sent by the terminal, send the PHR to the second base station, so that the second base station controls, according to the PHR, transmit power of the terminal in the second serving cell provided by the second base station.

17. The base station according to claim 16, wherein the sending module is further configured to before sending the PHR to the second base station, add, to the PHR, at least one of:
the quantity of PRBs allocated by the first base station to the terminal in the first serving cell provided by the first base station;
the quantity of PRBs allocated by the first base station to the terminal in the first serving cell provided by the first base station and the MCS index information of the first serving cell provided by the first base station;
the quantity of PRBs allocated by the first base station to the terminal in the first serving cell provided by the first base station and the closed-loop power control parameter of the first base station; and
the quantity of PRBs allocated by the first base station to the terminal in the first serving cell provided by the first base station, the MCS index information of the first serving cell provided by the first base station, and the closed-loop power control parameter of the first base station.

18. A terminal, comprising:
a sending module, configured to send to a first base station a power headroom report (PHR) for the first base station to control transmit power of the terminal in a first serving cell provided by the first base station, wherein the PHR comprises power headroom (PH) of the terminal in the first serving cell provided by the first base station, a quantity of physical resource blocks PRBs allocated by a second base station to the terminal in a second serving cell provided by the second base station, and PH of the terminal in the second serving cell provided by the second base station;
a processor connected to the sending module; and
a non-transitory computer readable medium connected to the processor and having stored thereon instructions that, when executed by the processor, cause the terminal to:
adjust, under control of the first base station, the transmit power of the terminal in the first serving cell provided by the first base station.

19. The terminal according to claim 18, wherein the instructions causing the terminal to adjust the transmit power of the terminal comprise instructions that, when executed by the processor, cause the terminal to:
adjust, under control of the second base station, transmit power of the terminal in the second serving cell provided by the second base station, wherein the control of the second base station is determined by the second base station according to a PHR that is sent by the first base station to the second base station.

20. The terminal according to claim 19, wherein the PHR further comprises at least one of data modulation and coding scheme (MCS) index information of the second serving cell provided by the second base station and a closed-loop power control parameter of the second serving cell provided by the second base station.

* * * * *